US012812243B2

(12) United States Patent
Kanaoka et al.

(10) Patent No.: US 12,812,243 B2
(45) Date of Patent: Nov. 24, 2026

(54) NON-TRANSITORY COMPUTER-READABLE RECORDING MEDIUM, WATCHING SYSTEM, AND CONTROL DEVICE

(71) Applicant: NIKON CORPORATION, Tokyo (JP)

(72) Inventors: Hiroshi Kanaoka, Tokyo (JP); Seiji Takano, Tokyo (JP); Yasuihiro Fuchikawa, Tokyo (JP); Tomotaka Shinoda, Tokyo (JP); Tatsuya Miyazaki, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 13 days.

(21) Appl. No.: 19/119,839

(22) PCT Filed: Oct. 25, 2023

(86) PCT No.: PCT/JP2023/038487
§ 371 (c)(1),
(2) Date: Apr. 28, 2025

(87) PCT Pub. No.: WO2024/090468
PCT Pub. Date: May 2, 2024

(65) Prior Publication Data
US 2026/0025485 A1 Jan. 22, 2026

(30) Foreign Application Priority Data
Oct. 25, 2022 (JP) ................................ 2022-170848

(51) Int. Cl.
*H04N 23/661* (2023.01)

(52) U.S. Cl.
CPC ................................ *H04N 23/662* (2023.01)

(58) Field of Classification Search
CPC ........ H04N 23/662; H04N 7/181; H04N 7/18; H04N 7/188; H04N 23/60; A61B 5/00; G06Q 50/10; G08B 25/04; H04M 11/00
See application file for complete search history.

(56) References Cited

U.S. PATENT DOCUMENTS

2013/0072807 A1* 3/2013 Tran .......................... A61B 5/00 600/595
2019/0104972 A1* 4/2019 Takagi .................... G06T 7/215
2019/0236924 A1 8/2019 Iwamoto

FOREIGN PATENT DOCUMENTS

JP 2008-083814 A 4/2008
JP 2014-229199 A 12/2014
(Continued)

OTHER PUBLICATIONS

Jan. 9, 2024 International Search Report issued in International Patent Application No. PCT/JP2023/038487.
(Continued)

*Primary Examiner* — Sinh Tran
*Assistant Examiner* — Zhenzhen Wu
(74) *Attorney, Agent, or Firm* — Oliff PLC

(57) ABSTRACT

Provided is a non-transitory computer-readable recording medium causing a computer to execute a process, the process including causing an imaging unit to start capturing of an image including a target person when a first predetermined time elapses after a state of the target person determined based on data acquired by an acquisition unit, which acquires the data on the state of the target person, becomes a predetermined state, giving notification about the capturing of the image during the first predetermined time, starting distribution of the image captured by the imaging unit when a second predetermined time elapses after the imaging unit starts the capturing of the image, and giving notification about the distribution during the second predetermined time.

15 Claims, 29 Drawing Sheets

(56) References Cited

FOREIGN PATENT DOCUMENTS

| | | | | |
|---|---|---|---|---|
| JP | 2019-133385 | A | | 8/2019 |
| JP | 2022-084002 | A | | 6/2022 |
| JP | 2022102691 | A | * | 7/2022 |

OTHER PUBLICATIONS

Apr. 29, 2025 International Preliminary Report on Patentability issued in International Patent Application No. PCT/JP2023/038487.

* cited by examiner

FIG. 16

<DISTRIBUTION DESTINATION LIST>

| ID | NAME | COMMUNICATION INFORMATION | GROUP |
|---|---|---|---|
| OB1 | ・・・・ | xxx. x. xxx. x, ・・・ | GROUP 1 |
| OB2 | ・・・・ | xxx. x. xxx. x, ・・・ | GROUP 2 |
| OB3 | ・・・・ | xxx. x. xxx. x, ・・・ | GROUP 3 |
| | | | |

NON-TRANSITORY COMPUTER-READABLE RECORDING MEDIUM, WATCHING SYSTEM, AND CONTROL DEVICE

CROSS-REFERENCE TO RELATED APPLICATION

This application is a national stage application of the prior International Patent Application No. PCT/JP2023/38487, filed on Oct. 25, 2023, which is based upon and claims the benefit of priority of the prior Japanese Patent Application No. 2022-170848, filed on Oct. 25, 2022, the entire contents of which are incorporated herein by reference.

FIELD

The present disclosure relates to a non-transitory computer-readable recording medium, a watching system, and a control device.

BACKGROUND

A watching system has been proposed which can remotely watch over a resident living alone, an elderly person who spends time alone in the day time, a sick person, or the like (for example, Patent Literature 1).

A watching system that takes the privacy of the target person into consideration is desired.

CITATION LIST

Patent Literature

[PTL 1]
Japanese Patent Application Laid-Open No. 2022-84002

SUMMARY

According to a first aspect of the present disclosure, a program causes a computer to execute a process of giving notification about start of capturing of an image including a target person when a state of the target person estimated from data acquired by an acquisition unit that acquires the data on the state of the target person becomes a predetermined state.

According to a second aspect of the present disclosure, a program causes a computer to execute a process of giving notification about distribution of an image including a target person captured by an imaging unit when a state of the target person estimated from data acquired by an acquisition unit that acquires the data on the state of the target person.

According to a third aspect of the present disclosure, a watching system includes: an acquisition unit configured to acquire data on a state of a target person; and a control unit configured to give notification about start of capturing of an image including the target person when the state of the target person becomes a predetermined state.

According to a fourth aspect of the present disclosure, a control device includes a control unit configured to give notification about start of capturing of an image including a target person when a state of the target person estimated from data acquired by an acquisition unit that acquires the data on the state of the target person becomes a predetermined state.

According to a fifth aspect of the present disclosure, a watching system includes: an acquisition unit configured to acquire data on a state of a target person; an imaging unit; and a control unit configured to give notification about distribution of an image including the target person captured by the imaging unit when the state of the target person becomes a predetermined state.

According to a sixth aspect of the present disclosure, a control device includes a control unit configured to give notification about distribution of an image including a target person captured by an imaging unit when a state of the target person estimated from data acquired by an acquisition unit that acquires the data on the state of the target person becomes a predetermined state.

The configuration of the embodiments described later may be appropriately modified, and at least some of the components may be replaced with other components. Further, the constituent elements whose arrangement is not particularly limited are not limited to the arrangement disclosed in the embodiment, and can be arranged at positions where their functions can be achieved.

BRIEF DESCRIPTION OF THE DRAWINGS

FIG. 16 is a diagram illustrating an example of a distribution destination list.

DESCRIPTION OF EMBODIMENTS

First Embodiment

Figure 1:
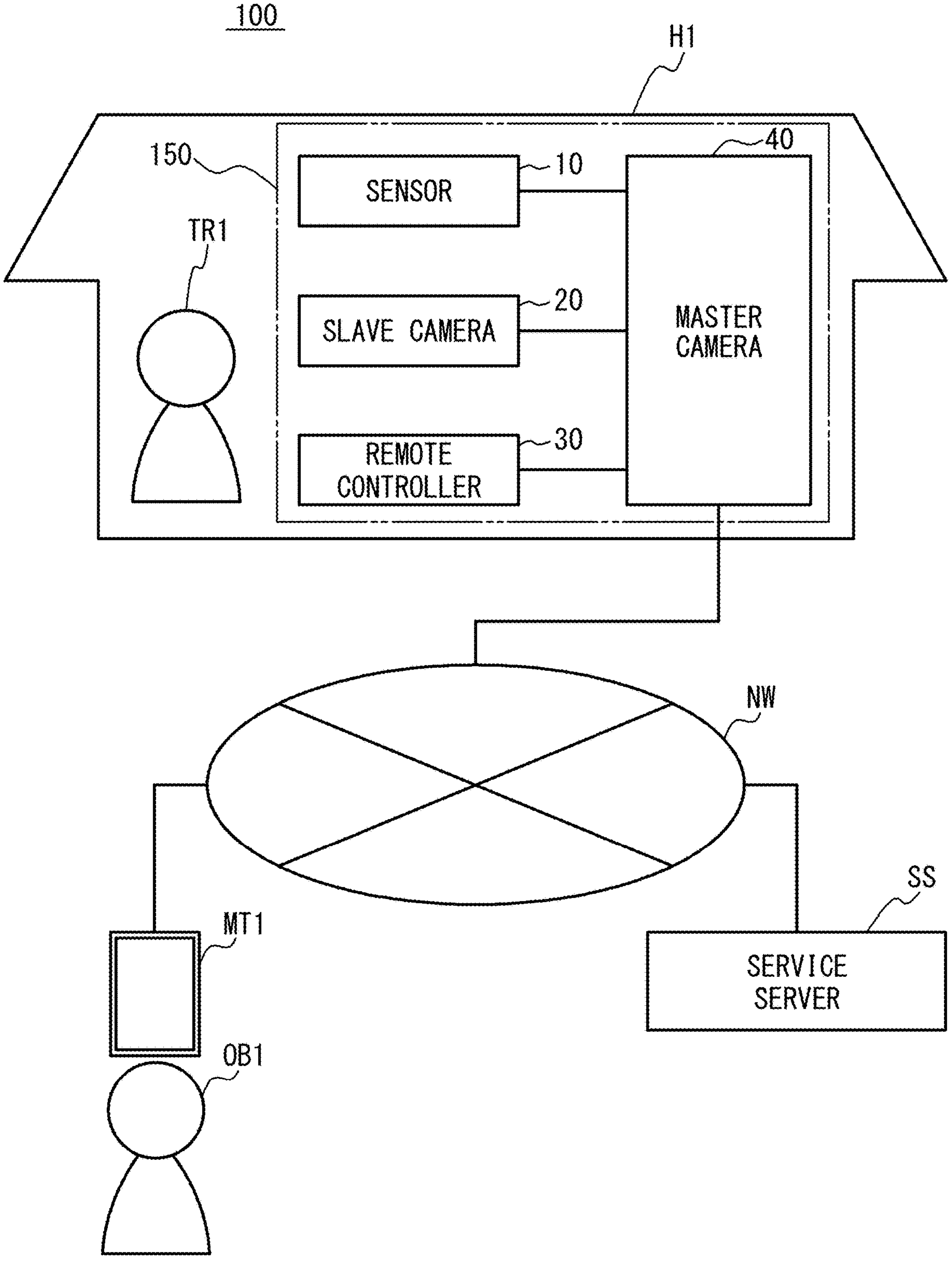
FIG. 1 is a diagram illustrating a configuration of a watching system according to a first embodiment.

A watching system 100 according to a first embodiment will be described in detail with reference to FIG. 1 to FIG. 9D. FIG. 1 is a block diagram illustrating a configuration of the watching system 100.

The watching system 100 is a system for persons (family members, relatives, helpers, care managers, or the like) related to a watching target person TR1 (hereinafter, referred to as a target person TR1) to watch over the target person TR1. In the following description, a person related to the target person TR1 is referred to as an observer OB1. As illustrated in FIG. 1, the watching system 100 according to the present embodiment includes a home-side system 150, a service server SS, and a mobile terminal MT1.

The home-side system 150 (more specifically, a master camera 40), the service server SS of the watching system 100, and the mobile terminal MT1 are connected via a network NW including a public wireless LAN, the Internet, a mobile telephone network, and the like. The communication among the home-side system 150, the service server SS, and the mobile terminal MT1 may be communication based on, for example, the NICE (Network of Intelligent Camera Ecosystem) specifications.

The mobile terminal MT1 is a mobile terminal carried by the observer OB1 who watches over the target person TR1, and is, for example, a smartphone, a tablet terminal, or a notebook PC (Personal Computer). A terminal such as a desktop PC of the observer OB1 may be used instead of the mobile terminal MT1. An application for using the watching system is installed in the mobile terminal MT1. The application allows the observer OB1 to give an instruction to the home-side system 150, receive a notification from the home-side system 150, and view images captured by the slave camera 20 and the master camera 40 included in the home-side system 150.

The service server SS is a server that provides a watching service. The service server SS sends push notifications of messages to the mobile terminal MT1 based on a request from the home-side system 150, and transmits instructions corresponding to the operation of the application installed in the mobile terminal MT1 to the home-side system 150.

The home-side system 150 is installed in, for example, a home H1 where the target person TR1 resides. The home-side system 150 includes, for example, a sensor 10, a slave camera 20, the master camera 40, and a remote controller 30.

The sensor 10, the slave camera 20, and the master camera 40 are installed in the home H1 or the like where the target person TR1 resides. The sensor 10, the slave camera 20, and the master camera 40 are installed in places where the target person TR1 stays and uses, such as a room, a corridor, a bathroom, a washroom, and a toilet.

Figure 2:
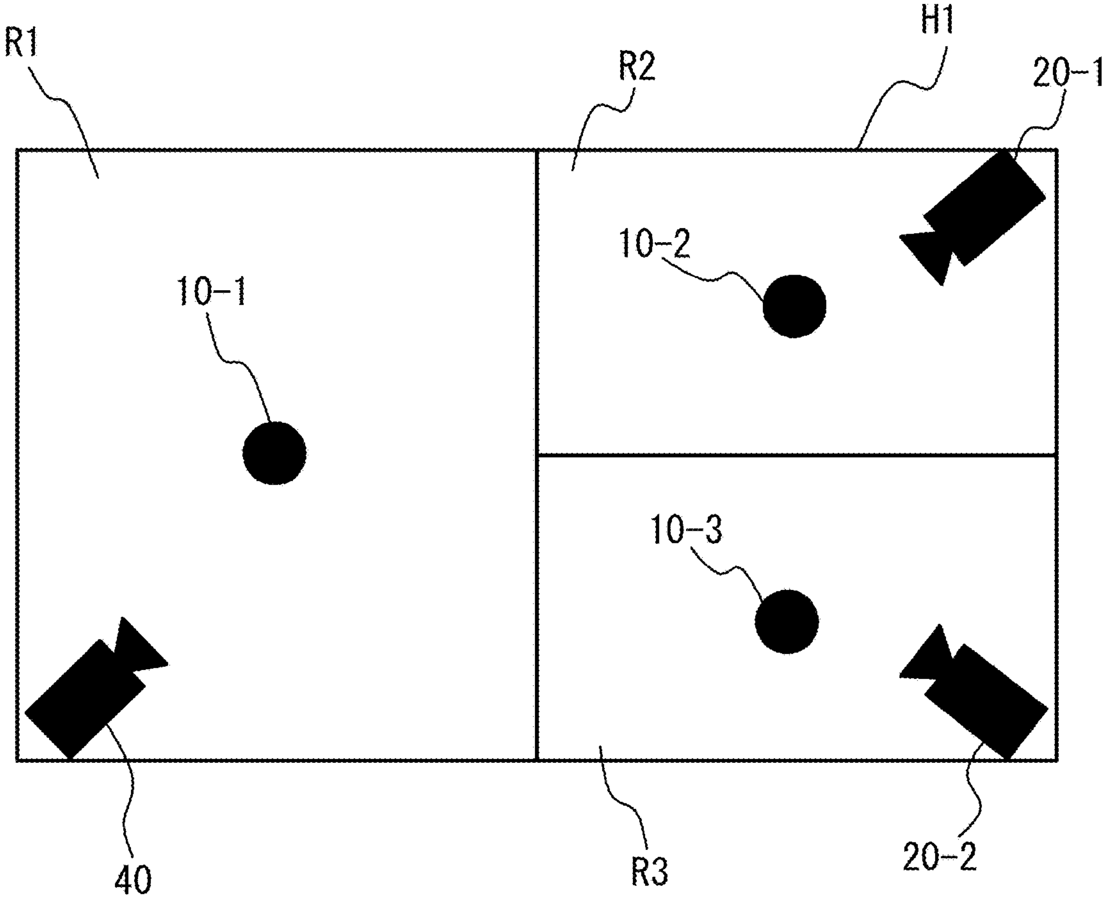
FIG. 2 is a diagram for describing an example of the installation of a sensor, a slave camera, and a master camera.

FIG. 2 is a diagram for describing an example of installation of the sensor 10, the slave camera 20, and the master camera 40. In the example of FIG. 2, the home H1 has three rooms R1 to R3. The sensors 10 are installed in the rooms R1 to R3, respectively. In FIG. 2, the sensors 10 installed in the respective rooms R1 to R3 are referred to as sensors 10-1 to 10-3, respectively. In FIG. 2, the number of the sensors 10 installed in each room is one, but the number of sensors installed in each room may be two or more.

At least one camera is installed in the room in which the sensor 10 is installed.

In the example of FIG. 2, the master camera 40 is installed in the room R1 where the sensor 10-1 is installed, and the slave cameras 20 are installed in the rooms R2 and R3 where the sensors 10-2 and 10-3 are installed, respectively. In FIG. 2, the slave cameras 20 installed in the rooms R2 and R3 are referred to as slave cameras 20-1 and 20-2, respectively. The slave camera 20 and the master camera 40 may be installed on a ceiling, may be installed on a wall, or may be installed at any location in the room. In FIG. 2, the number of cameras installed in each room is one, but the number of cameras installed in each room may be two or more. For example, the master camera 40 and the slave camera 20 may be installed in the room R1, or a plurality of the slave cameras 20 may be installed in the room R2.

The sensors 10 (sensors 10-1 to 10-3 in the example of FIG. 2) and the master camera 40 are connected to each other by, for example, DECT (Digital Enhanced Cordless Telecommunications). The sensor 10 and the master camera 40 may be connected to each other by a wired LAN (Local Area Network), a wireless LAN, Wi-Fi, or proximity communication such as Bluetooth (registered trademark).

The slave cameras 20 (slave cameras 20-1 and 20-2 in the example of FIG. 2) and the master camera 40 are connected by, for example, Wi-Fi. The slave camera 20 and the master camera 40 may be connected to each other by a wired LAN, a wireless LAN, or proximity communication such as Bluetooth (registered trademark).

The remote controller 30 and the master camera 40 are connected to each other by, for example, DECT. The remote controller 30 and the master camera 40 may be connected to each other by a wireless LAN, Wi-Fi, or proximity communication such as Bluetooth (registered trademark).

(Sensor 10)

The sensor 10 acquires data on the state of the target person TR1. In the present embodiment, the sensor 10 acquires data on the state of the target person TR1 other than the visible light image. Examples of the sensor 10 include an infrared array sensor, an infrared camera, a depth sensor, a radio wave sensor (millimeter wave radar), a vibration sensor, a sound sensor, a wearable sensor, a thermometer, and a hygrometer. In the present embodiment, the sensor 10 is described as an infrared array sensor. A camera equipped with a filter for cutting visible light may be used as the sensor 10.

In the present embodiment, for example, the sensor 10 is attached to a ceiling. When the sensor 10 is an infrared array sensor, the sensor 10 acquires, for example, data of temperature distribution below the sensor 10. Unlike the visible light image, the temperature distribution data is data that does not allow the face, clothes, and the like of the subject to be visually recognized, and thus the privacy of the target person TR1 can be protected. In addition, since the infrared array sensor does not have a lens, it is possible to inhibit the target person TR1 from having a sense of "being monitored", "privacy being violated", or the like, and to reduce a psychological burden on the target person TR1. The sensor 10 may be attached to, for example, a wall surface.

The data acquired by the sensor 10 is transmitted to the master camera 40.

(Remote Controller 30)

The remote controller 30 communicates with the master camera 40 and transmits an instruction corresponding to an operation on the remote controller 30 to the master camera 40. The remote controller 30 includes, for example, a button or a touch panel for inputting various instructions. The remote controller 30 may include at least one of a microphone for inputting an instruction by voice and a loudspeaker for giving notification to the target person TR1 by voice. The remote controller 30 may be a terminal such as a smartphone in which an application of the watching system 100 is installed.

(Master Camera 40)

The master camera 40 captures a visible light image (hereinafter, referred to as an image). In the present embodiment, the home-side system 150 includes one master camera 40, but may include a plurality of the master cameras 40.

Figure 3A:
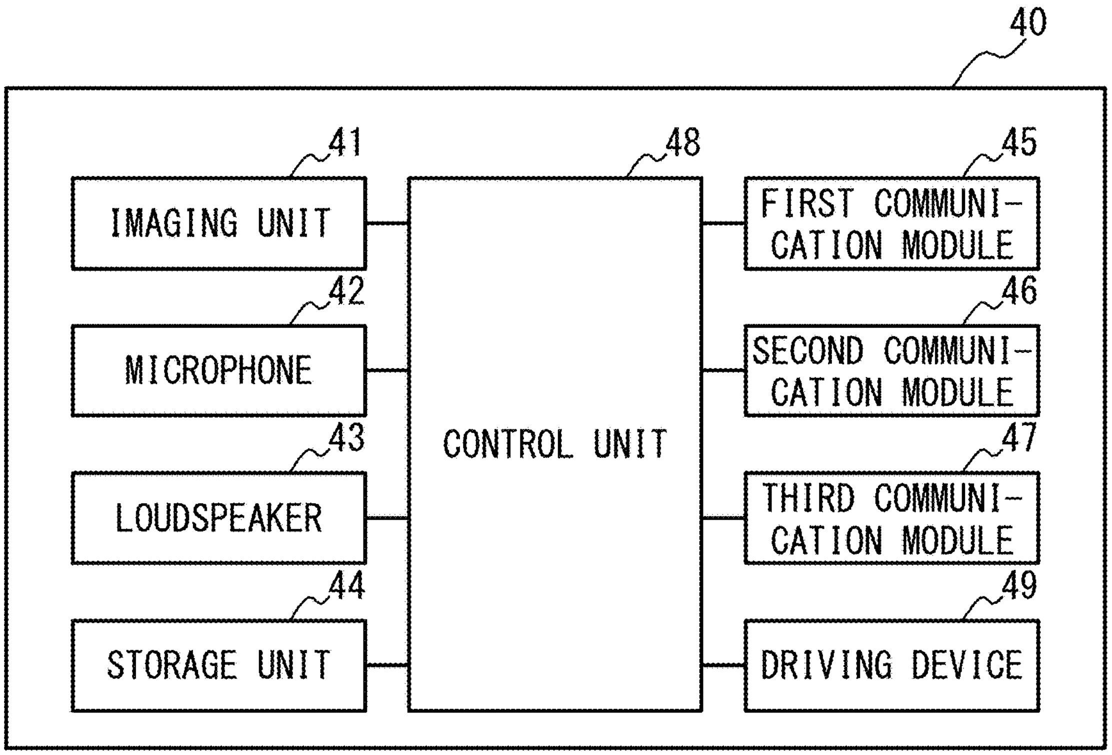
FIG. 3A is a block diagram illustrating a configuration of the master camera.

FIG. 3A is a block diagram illustrating a configuration of the master camera 40. The master camera 40 includes an imaging unit 41, a microphone 42, a loudspeaker 43, a storage unit 44, a first communication module 45, a second communication module 46, a third communication module 47, a control unit 48, and a driving device 49.

The imaging unit 41 includes a lens, an imaging element, and the like, and captures an image within an imaging range.

The microphone 42 acquires voice or the like emitted by the target person TR1 and transmits the acquired voice to the control unit 48. The microphone 42 may be used as the sensor 10.

The loudspeaker 43 outputs predetermined sound under the control of the control unit 48.

The storage unit 44 is, for example, a storage device such as a hard disk drive (HDD) or a solid state drive (SSD), and stores the image captured by the imaging unit 41.

The first communication module 45 is, for example, a DECT module, and enables communication with the sensor 10 and the remote controller 30.

The second communication module 46 is, for example, a Wi-Fi module, and enables communication with the slave camera 20.

The third communication module 47 is, for example, an LTE (Long Term Evolution) module, and enables communication with the service server SS and the mobile terminal MT1.

The control unit 48 controls the entire operation of the master camera 40. The details of the process executed by the control unit 48 will be described later.

The driving device 49 is, for example, an actuator such as a motor, and is driven based on an instruction from the control unit 48 to move a cover 422 (details will be described later) included in the master camera 40.

(Slave Camera 20)

The slave camera 20 captures a visible light image, similarly to the master camera 40. In the present embodiment, the home-side system 150 includes one or more slave cameras 20. In a case that the target person TR1 can be watched only by the master camera 40, the slave camera 20 may be omitted.

Figure 3B:
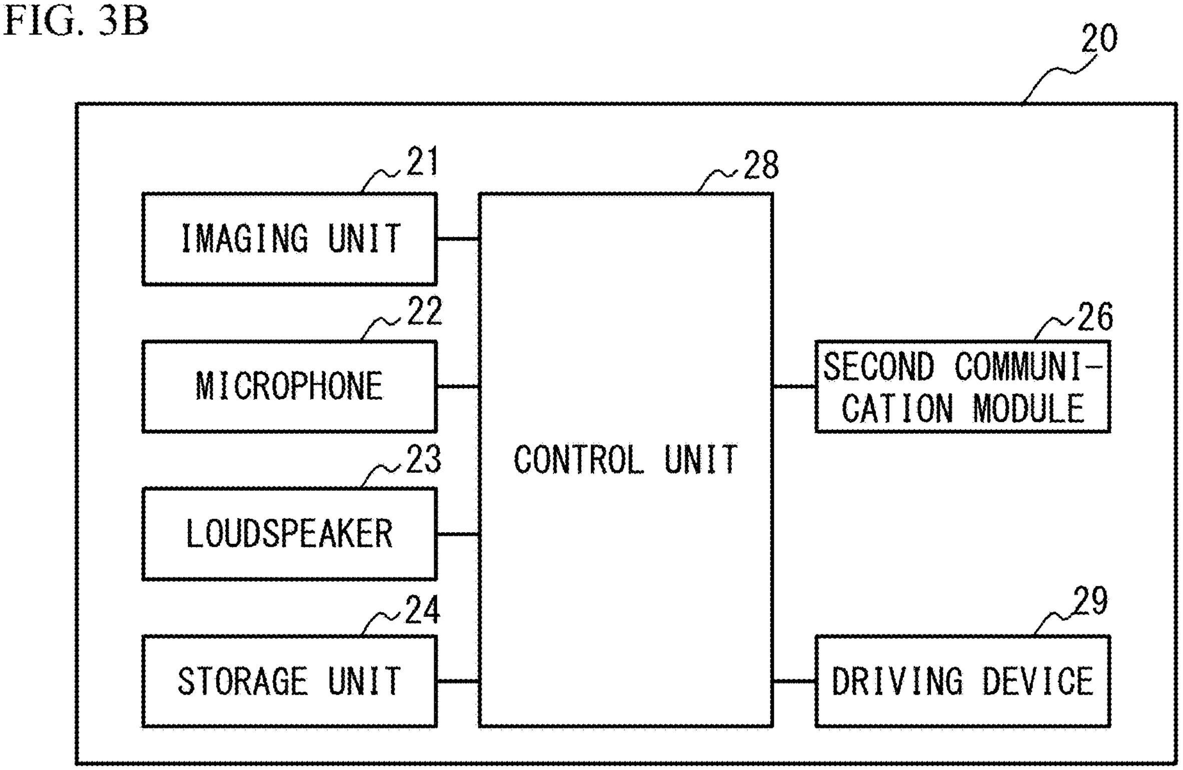
FIG. 3B is a block diagram illustrating a configuration of the slave camera.

FIG. 3B is a block diagram illustrating a configuration of the slave camera 20. The slave camera 20 includes an imaging unit 21, a microphone 22, a loudspeaker 23, a storage unit 24, a second communication module 26, a control unit 28, and a driving device 29.

The slave camera 20 is different from the master camera 40 in that the first communication module 45 and the third communication module 47 are omitted. In the slave camera 20, the second communication module 26 is, for example, a Wi-Fi module, and enables communication with the master camera 40. Other configurations are the same as those of the master camera 40, and thus detailed description thereof will be omitted.

Next, structural features of the slave camera 20 and the master camera 40 according to the present embodiment will be described. Since the slave camera 20 and the master camera 40 have substantially the same structure, the master camera 40 will be described here.

Figure 4A:
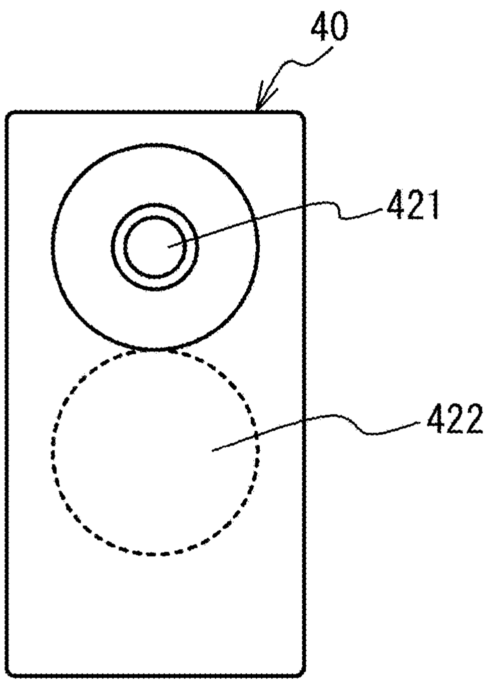
FIG. 4A and FIG. 4B are views illustrating the master camera according to the present embodiment.
Figure 4B:
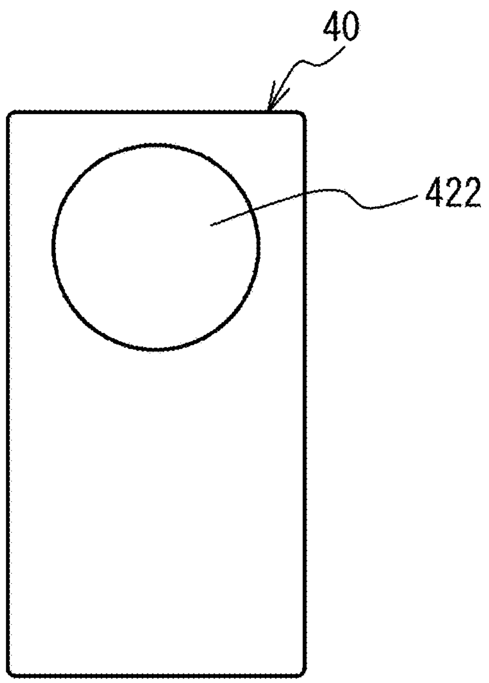

FIG. 4A and FIG. 4B are views illustrating the master camera 40 according to the present embodiment. As illustrated in FIG. 4A and FIG. 4B, for example, the master camera 40 includes a lens 421 and the cover 422 that covers the lens 421.

The cover 422 is moved up and down by the driving device 49 being driven based on the control of the control unit 48. The control unit 48 sets the imaging unit 41 (lens 421) of the master camera 40 to a state in which an image cannot be captured (state illustrated in FIG. 4B) until it is determined that an abnormality has occurred in the target person TR1 based on the data from the sensor 10. Specifically, the driving device 49 is controlled so that the cover 422 covers the lens 421. That is, the control unit 48 makes the lens 421 of the master camera 40 invisible from the target person TR1 until it is determined that an abnormality has occurred in the target person TR1. Therefore, the imaging unit 41 (lens 421) of the master camera 40 becomes in a state in which it is physically unable to capture an image.

Since the lens 421 is covered by the cover 422, the target person TR1 cannot visually recognize the lens 421. This can inhibit the target person TR1 from having a sense of "being monitored", "privacy being violated", or the like during normal times (when no abnormality has occurred in the target person TR1).

When it is determined that an abnormality has occurred in the target person TR1, the control unit 48 moves the cover 422, for example, downward to bring the lens 421 into a state in which it can capture an image (the state illustrated in FIG. 4A). In this manner, the appearance of the master camera 40 is different between a state in which an image can be captured and a state in which an image cannot be captured. In other words, the master camera 40 has a first appearance (appearance in which the lens 421 is visible) when an abnormality has occurred in the target person TR1, and has a second appearance (appearance in which the lens 421 is not visible) in other cases. As described above, since the target person TR1 can know that the image including himself/herself is not captured by the appearance of the master camera 40, the target person TR1 can easily check whether his/her privacy is protected, and can feel secure. The cover 422 may be colored differently from the housing of the master camera 40, or the cover 422 may be marked with "X" so that it is easily visually recognized that the lens 421 is covered with the cover 422.

In FIG. 4A and FIG. 4B, an example in which the master camera 40 includes the cover 422 that covers the lens 421 during normal times has been described, but the configuration of the master camera 40 is not limited thereto.

Figure 4C:
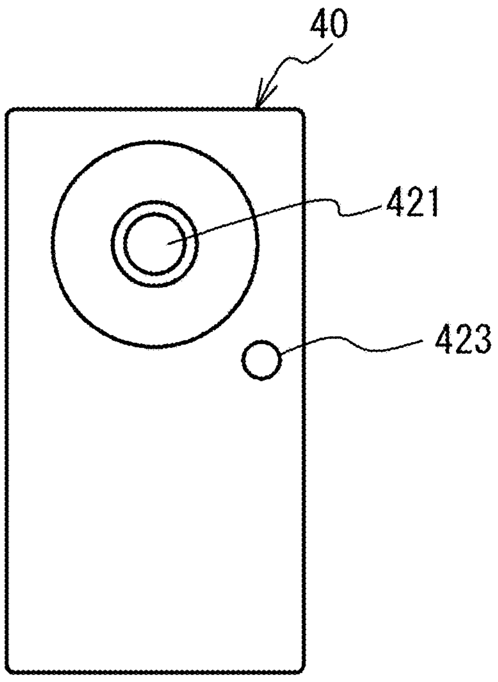
FIG. 4C and FIG. 4D are views illustrating another example of the master camera according to the present embodiment.
Figure 4D:
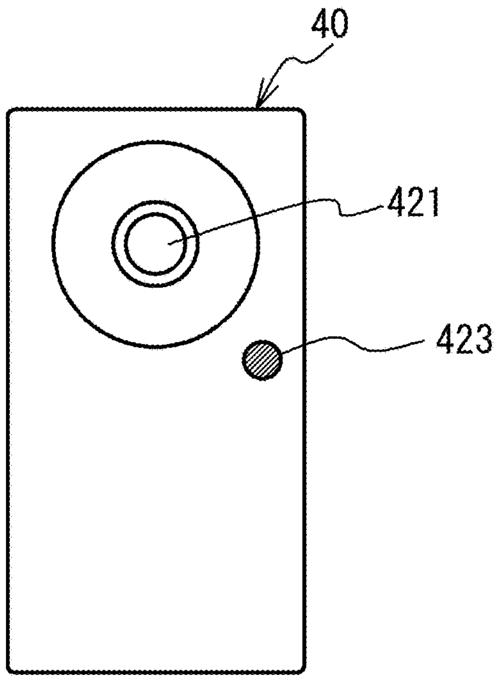

FIG. 4C and FIG. 4D are views illustrating another example of the master camera 40. The master camera 40 illustrated in FIG. 4C and FIG. 4D includes the lens 421 and an LED light 423.

In the master camera 40 illustrated in FIG. 4C and FIG. 4D, the control unit 48 causes the LED light 423 to emit light in a first color (for example, red) when the imaging unit 41 of the master camera 40 cannot capture an image, and causes the LED light 423 to emit light in a second color (for example, green) different from the first color when the imaging unit 41 can capture an image. This allows the target person TR1 to know whether the master camera 40 can capture an image by the color of the LED light 423.

Until it is determined that an abnormality has occurred in the target person TR1, the control unit 48 may set the imaging direction (orientation of the lens 421) of the master camera 40 to a direction different from the direction in which the preset imaging range exists, or may cause the master camera 40 to wait at a place (for example, under the bed) where the target person TR1 cannot visually recognize the master camera 40 (or the lens 421). Even in such a method, since the master camera 40 or the lens 421 cannot be visually recognized from the target person TR1, it is possible to inhibit the target person TR1 from having a sense of "being monitored", "privacy being violated", or the like. When the direction of the lens 421 is set to a direction different from the direction in which the preset imaging range exists, an image not including the target person TR1 may be captured.

Figure 5:
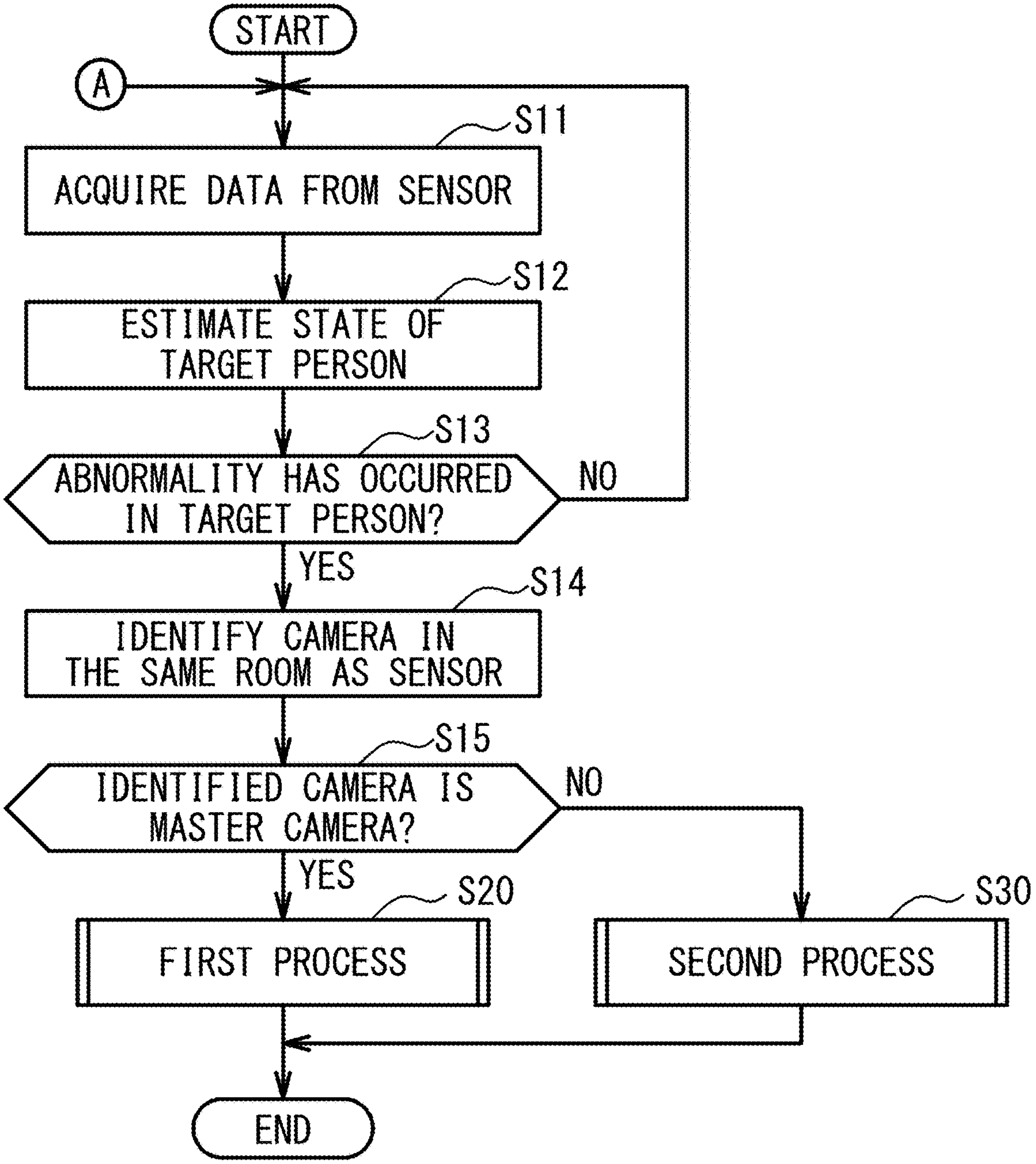
FIG. 5 is a flowchart illustrating an example of a process executed by a control unit of the master camera.

Next, processes executed in the watching system 100 will be described. First, a process executed by the control unit 48 of the master camera 40 will be described. FIG. 5 is a flowchart illustrating an example of a process executed by the control unit 48 of the master camera 40.

In the process of FIG. 5, the control unit 48 first acquires data on the state of the target person TR1 from the sensor 10 (step S11). In the present embodiment, the sensor 10 is an infrared array sensor, and therefore the control unit 48 acquires temperature distribution data detected by the sensor 10.

Next, the control unit 48 estimates the state of the target person TR1 based on the acquired data (in the present embodiment, the temperature distribution data) (step S12). For example, the control unit 48 estimates that the target person TR1 is standing when the highest temperature included in the temperature distribution data is equal to or higher than a first temperature, and determines that the target person TR1 is sitting when the lowest temperature is equal to or higher than a second temperature, the highest temperature is equal to or lower than a third temperature, and the area of the region where the temperature is equal to or higher than the second temperature and equal to or lower than the third temperature is within a predetermined range. The control unit 48 estimates that the target person TR1 is in a fallen state when the lowest temperature is equal to or higher than the second temperature, the highest temperature is equal to or lower than the third temperature, and the area of the region where the temperature is equal to or higher than the second temperature and equal to or lower than the third temperature is larger than a predetermined area. As a method of estimating the state of the target person TR1 by the infrared array sensor, for example, a method described in Shingaku Giho, vol. 114, no. 166, ASN2014-81, pp. 219 to 224, July 2014 can be used.

Then, the control unit 48 determines whether the estimated state of the target person TR1 is a state (predetermined state) in which an abnormality has occurred in the target person TR1 (step S13). When no abnormality has occurred in the target person TR1 (step S13/NO), the process returns to step S11. The state in which an abnormality has occurred in the target person TR1 is, for example, a state in which the target person TR1 falls or remains motionless in the same posture for a long period.

When an abnormality has occurred in the target person TR1 (step S13/YES), the control unit 48 identifies a camera provided in the same place (room or the like) as the sensor 10 that has detected the abnormality of the target person TR1 (step S14). For example, a table in which the sensors and the cameras provided in the respective rooms are associated with each other is stored in the storage unit 44, and the control unit 48 can identify the camera provided in the same place (room or the like) as the sensor 10 that has detected the abnormality of the target person TR1 by referring to the table.

Then, the control unit 48 determines whether the camera identified in step S14 is the master camera 40 (step S15). For example, in the example of FIG. 2, when the sensor 10 that has detected the abnormality of the target person TR1 is the sensor 10-1 installed in the room R1, the camera identified in step S14 is the master camera 40. When the camera identified in step S14 is the master camera 40 (step S15/YES), the control unit 48 executes a first process (step S20).

Figure 6:
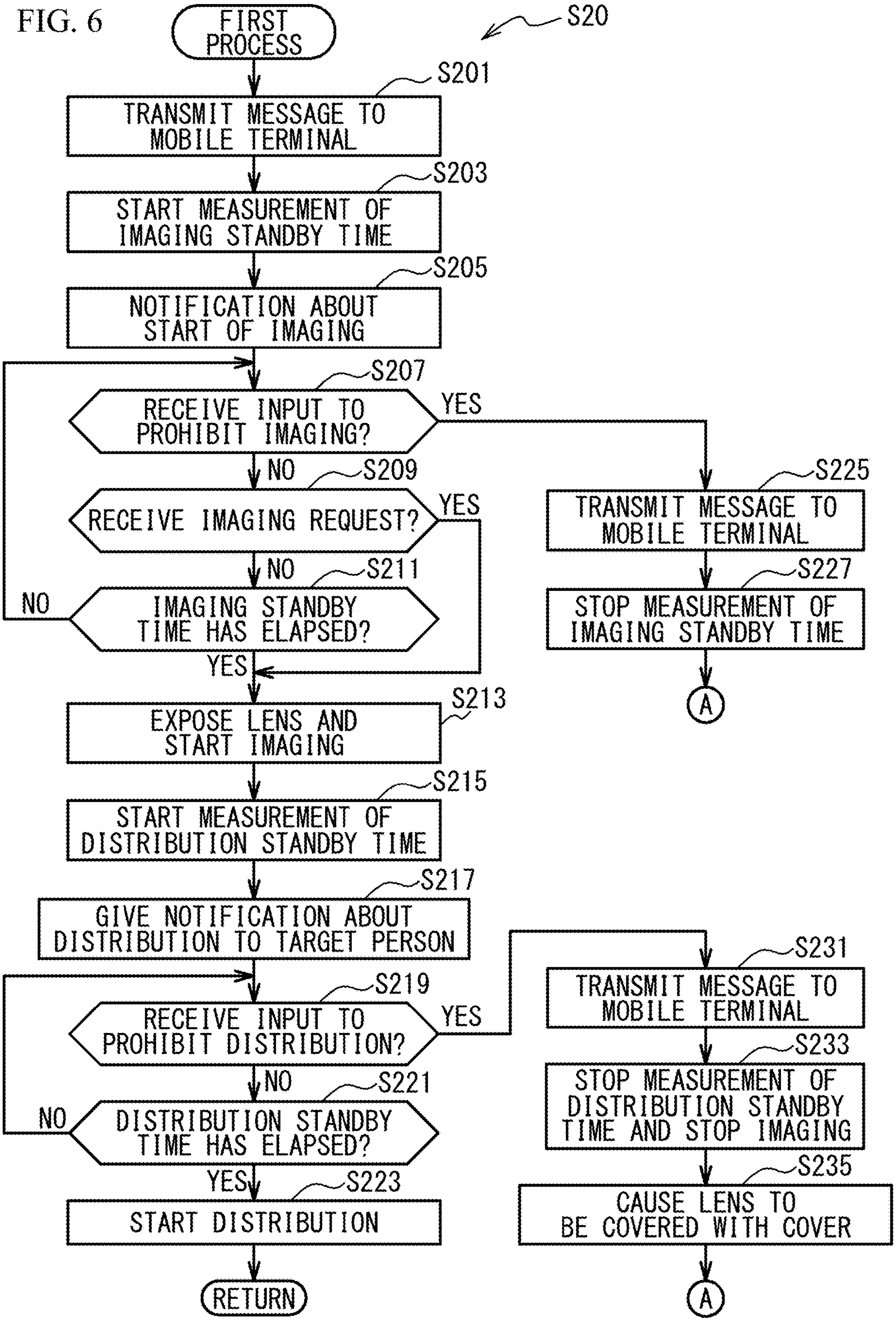
FIG. 6 is a flowchart illustrating details of a first process.

FIG. 6 is a flowchart illustrating details of the first process. In the process of FIG. 6, first, the control unit 48 transmits a predetermined message to the mobile terminal MT1 (step S201). For example, the control unit 48 transmits a message indicating that there is a possibility that an abnormality has occurred in the target person TR1. The message may be transmitted to the mobile terminal MT1 via the service server SS or directly from the control unit 48.

Then, the control unit 48 starts measurement of the imaging standby time (step S203). The imaging standby time is a predetermined time until the slave camera 20 or the master camera 40 starts capturing images including the target person TR1. The slave camera 20 and the master camera 40 may capture images not including the target person TR1 before or after capturing images including the target person TR1. This allows the slave camera 20 and the master camera 40 to be used as, for example, a security camera or a camera for watching over a pet. Any time can be set as the imaging standby time. During the imaging standby time, the slave camera 20 and the master camera 40 do not capture an image including the target person TR1. The slave cameras 20 (slave cameras 20-1 and 20-2 in the example of FIG. 2) that are not installed in the same location as the sensor 10 that has detected the abnormality of the target person TR1 may capture images because the images do not include the target person TR1. Thus, the slave camera 20 and the master camera 40 can be used as, for example, a security camera or a camera for watching over a pet.

Then, the control unit 48 gives notification about the start of imaging to the target person TR1 (step S205). Specifically, the control unit 48 gives notification about the start of imaging to the target person TR1 by using the loudspeaker 43. For example, the control unit 48 causes the loudspeaker 43 to output a voice such as "Imaging will be started in five seconds", and notifies the target person TR1 of the timing at which imaging by the master camera 40 is started. The control unit 48 may notify the target person TR1 of a time until the imaging is started, that the current time is within the imaging standby time, that the current time is within a period in which the imaging can be prohibited (canceled), or the like by the loudspeaker 43 instead of the timing at which the imaging is started. This allows the target person TR1 to know the timing at which the image capturing is started, the time until the image capturing is started, the fact that the image capturing is not yet performed, or the fact that the image capturing can be prohibited.

The order of the processes of steps S201 to S205 can be freely changed.

Then, the control unit 48 determines whether an input to prohibit imaging has been received (step S207). Specifically, the control unit 48 performs a voice recognition process on the sound input from the microphone 42, and determines whether a predetermined voice for prohibiting imaging (for example, "Prohibit imaging", "Do not capture", "Stop", "False detection", "No abnormality", "Don't", or the like) is included in the input sound. When the voice for prohibiting imaging is included, the control unit 48 determines that the input to prohibit imaging has been received.

When the input to prohibit imaging has been received (step S207/YES), the target person TR1 is in a state where he/she can perform the input to prohibit imaging (a state where no abnormality has occurred), and thus it is considered that the determination in step S13 of FIG. 5 is erroneous (erroneous determination/erroneous detection). In this case, the control unit 48 transmits a predetermined message to the mobile terminal MT1 (step S225). For example, when the control unit 48 receives an input to prohibit imaging, the control unit 48 transmits a message for reporting that an abnormality is erroneously detected or that no abnormality has occurred in the target person TR1. This allows the person OB1 who carries the mobile terminal MT1 (the observer of the target person TR1) can know the safety of the target person TR1.

Then, the control unit 48 stops measurement of the imaging standby time (step S227), and returns to step S11 in FIG. 5. This means that the imaging by the master camera 40 is not started. Therefore, it is possible to prevent the target person TR1 from being imaged even though no abnormality has occurred, and to protect the privacy of the target person TR1.

When the input to prohibit imaging is not received (step S207/NO), the control unit 48 determines whether a request to capture an image including the target person TR1 is received from the mobile terminal MT1 (step S209). For example, when a button of "imaging request" is pressed (tapped) on the application installed in the mobile terminal MT1, the imaging request is transmitted from the mobile terminal MT1. The imaging request may be directly transmitted from the mobile terminal MT1 to the master camera 40, or may be transmitted via the service server SS.

When the imaging request is not received (step S209/NO), the control unit 48 determines whether the imaging standby time has elapsed (step S211). Specifically, it is determined whether the imaging standby time has elapsed since the start of the measurement of the imaging standby time in step S203. When the imaging standby time has not elapsed (step S211/NO), the process returns to step S207.

When the imaging request is received (step S209/YES) or when the imaging standby time has elapsed (step S211/YES), the control unit 48 moves the cover 422 covering the lens 421 to expose the lens 421 and causes the imaging unit 41 to start capturing images including the target person TR1 (step S213). At this time, the control unit 48 may record the images captured by the imaging unit 41 in the storage unit 44.

When the capturing of the images including the target person TR1 is started, the control unit 48 starts measurement of the distribution standby time (step S215). The distribution standby time is a predetermined time from the start of image capturing to the start of image distribution. During the distribution standby time, images including the target person TR1 are not distributed. For example, when the slave camera 20 is capturing images not including the target person TR1, the images not including the target person TR1 may be distributed. This allows the slave camera 20 and the master camera 40 to be used as, for example, a security camera or a camera for watching over a pet.

Then, the control unit 48 gives notification about the distribution to the target person TR1 (step S217). For example, the control unit 48 causes the loudspeaker 43 to output a voice such as "Distribution will be started in five seconds", and notifies of the timing at which the distribution of the image is started. Instead of the timing at which the distribution of the image is started, the target person TR1 may be notified of a time until the distribution of the image is started, that the current time is within the distribution standby time, that the current time is in a period in which the distribution can be prohibited, or the like. This allows the target person TR1 to know the timing at which the distribution of the image is started, the time until the distribution of the image is started, the fact that the distribution of the image is not yet performed, or the fact that the distribution can be prohibited.

Then, the control unit 48 determines whether an input to prohibit distribution of images has been received (step S219). For example, the control unit 48 performs voice recognition processing on the sound input from the microphone 42, and determines whether the input sound includes a predetermined voice for prohibiting distribution of images (for example, "Prohibit distribution", "Do not distribute", "Stop distribution", "False detection", "No abnormality", "Don't", or the like). When the predetermined voice is included, the control unit 48 determines that the input to prohibit the distribution of images has been received.

When the input to prohibit the distribution of images has been received (step S219/YES), it is considered that the determination in step S13 of FIG. 5 is erroneous (erroneous determination/erroneous detection). In this case, the control unit 48 transmits a predetermined message to the mobile terminal MT1 (step S231). For example, the control unit 48 transmits a message reporting that the abnormality is erroneously detected or that there is no abnormality in the target person TR1. This allows the person OB1 carrying the mobile terminal MT1 (the observer of the target person TR1) to know that the target person TR1 is safe.

Then, the control unit 48 stops the measurement of the distribution standby time and stops the capturing of the image by the imaging unit 41 (step S233). This prevents images from being distributed, thus it is possible to prevent the image of the target person TR1 from being distributed even though no abnormality has occurred in the target person TR1, and it is possible to protect the privacy of the target person TR1. When images are recorded in the storage unit 44, the recorded images may be deleted. This makes it possible to further protect the privacy of the target person TR1.

Then, the control unit 48 drives the driving device 49 to cover the lens 421 with the cover 422 (step S235). This allows the target person TR1 to visually recognize that the image is not being captured, and thus it is possible to give the target person TR1 a sense of security that privacy is protected. Thereafter, the process returns to step S11 in FIG. 5.

When the input to prohibit the distribution of the image is not received (step S219/NO), the control unit 48 determines whether the distribution standby time has elapsed (step S221). Specifically, it is determined whether the distribution standby time has elapsed since the start of the measurement of the distribution standby time in step S215. When the distribution standby time has not elapsed (step S221/NO), the process returns to step S219.

When the distribution standby time has elapsed (step S221/YES), the control unit 48 starts distribution of the image (step S223) and ends the first process (step S20). The image may be distributed by live-view distribution, or an image captured a predetermined time (for example, several seconds) before the current time may be distributed. Further, past images may be viewed retrospectively.

On the other hand, when the camera identified in step S14 of FIG. 5 is the slave camera 20 (step S15/NO), that is, when the camera installed in the same place as the sensor 10 that has detected the abnormality of the target person TR1 is the slave camera 20, the control unit 48 performs a second process (step S30).

Figure 7:
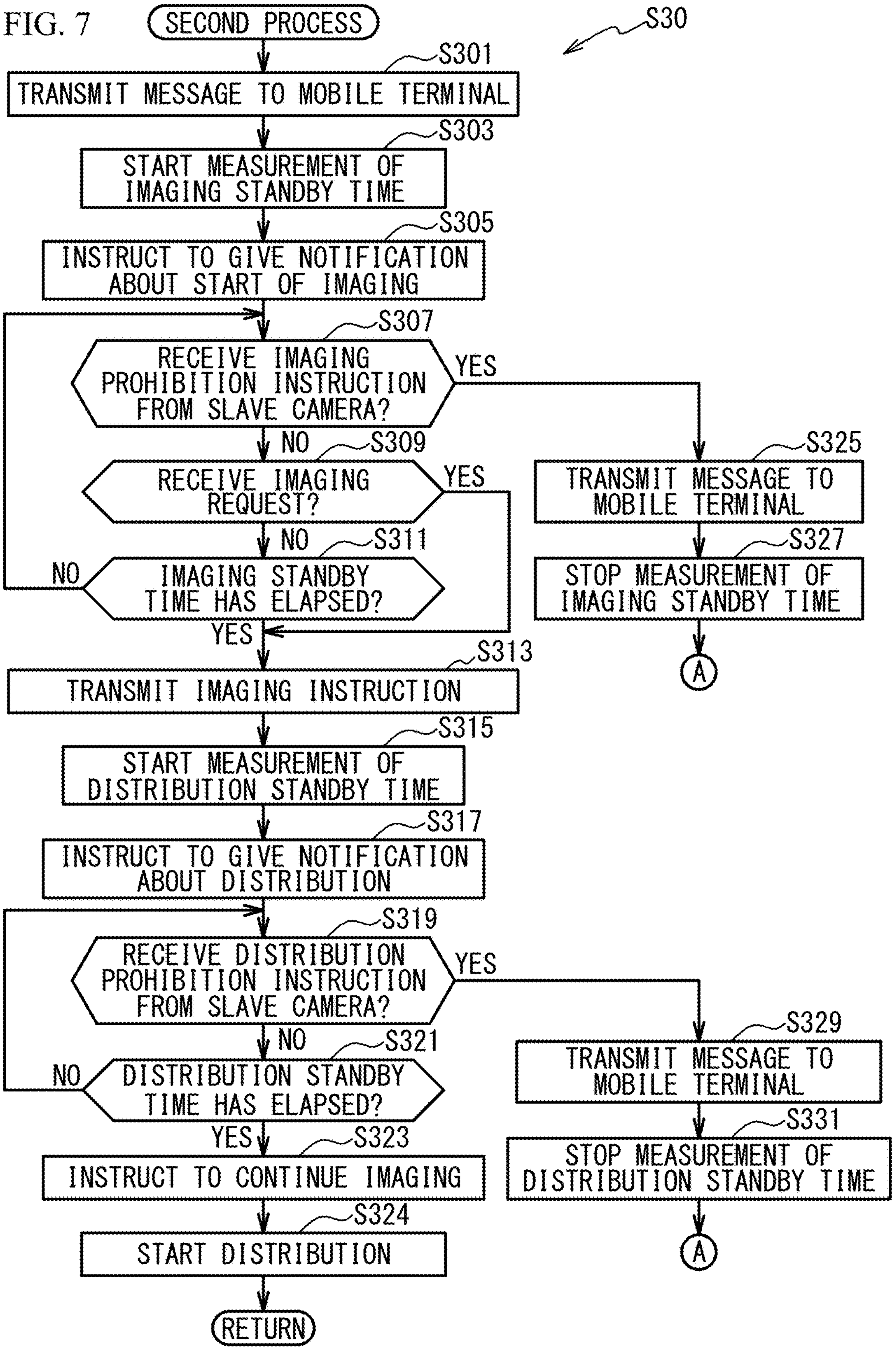
FIG. 7 is a flowchart illustrating details of a second process.
Figure 8:
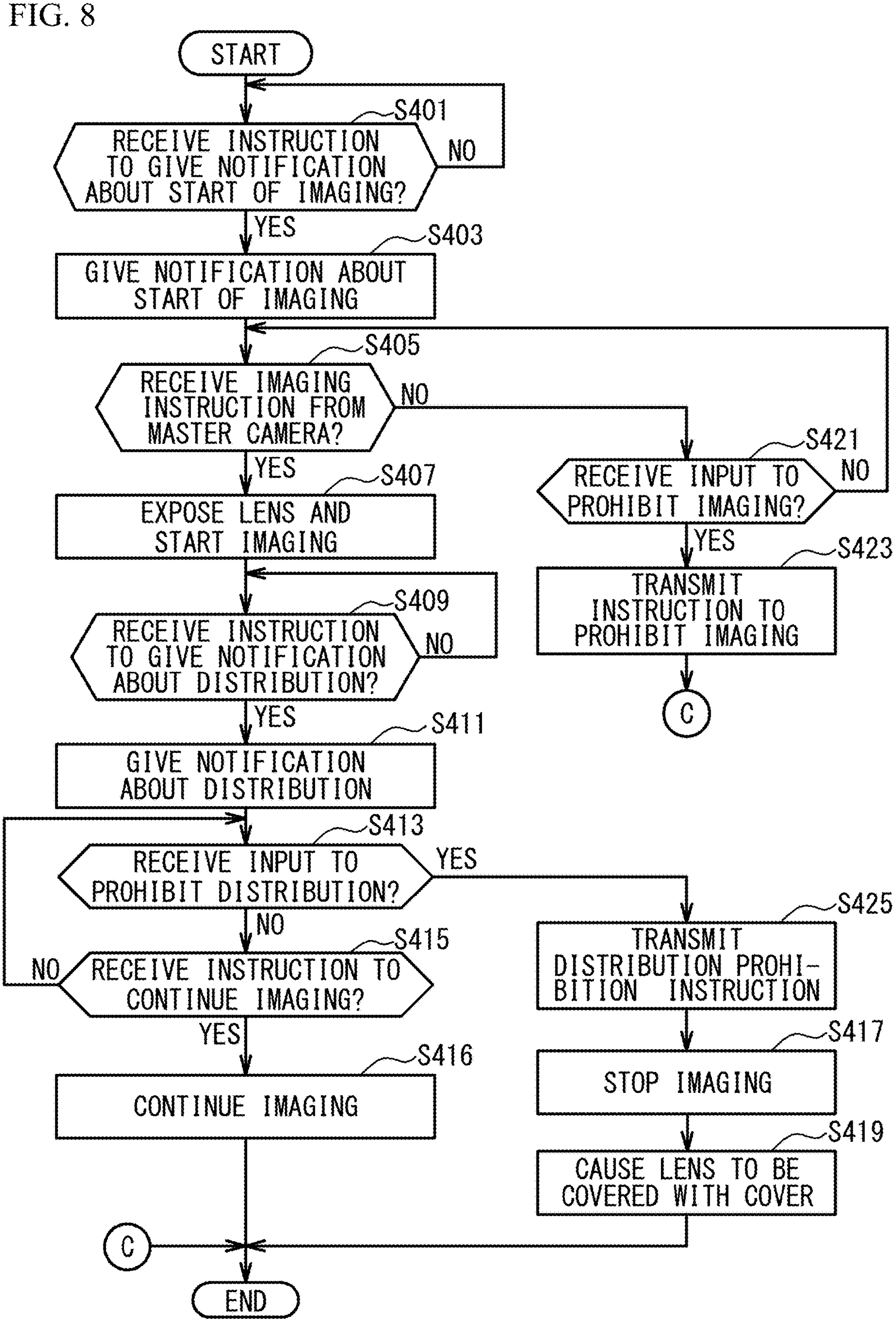
FIG. 8 is a flowchart illustrating an example of a process executed by a control unit of the slave camera.

FIG. 7 is a flowchart illustrating details of the second process. FIG. 8 is a flowchart illustrating an example of a process executed by the control unit 28 of the slave camera 20. The second process will be described together with the process executed by the control unit 28 of the slave camera 20.

The processes of step S301 and step S303 in FIG. 7 are the same as the processes of step S201 and step S203 in the first process illustrated in FIG. 6, respectively, and therefore, description thereof is omitted.

When the measurement of the imaging standby time is started (step S303), the control unit 48 instructs the slave camera 20 to give notification about the start of imaging (step S305).

On the other hand, the control unit 28 of the slave camera 20 waits until an instruction to give notification about the start of imaging is received from the master camera 40 (FIG. 8: step S401/NO). When the instruction to give notification about the start of imaging is received from the master camera 40 (step S401/YES), the control unit 28 gives notification about the start of imaging using the loudspeaker 23 in the same manner as in step S205 of FIG. 6 (step S403).

Then, the control unit 28 determines whether an imaging instruction is received from the master camera 40 (step S405). When the imaging instruction is not received (step S405/NO), the control unit 28 determines whether an input to prohibit imaging has been received from the target person TR1 (step S421). For example, the control unit 28 performs voice recognition processing on the sound input from the microphone 22, and determines whether a predetermined voice for prohibiting image capturing is included in the input sound. When the predetermined voice is included, the control unit 28 determines that the input to prohibit image capturing is received.

When the input to prohibit imaging is not received (step S421/NO), the process returns to step S405. When the input to prohibit imaging is received (step S421/YES), the control unit 28 transmits information (imaging prohibition instruction) indicating that the input to prohibit imaging is received to the master camera 40 (step S423), and ends the process of FIG. 8.

On the other hand, the control unit 48 of the master camera 40 determines whether the imaging prohibition instruction has been received from the slave camera 20 (FIG. 7: step S307). When the imaging prohibition instruction has been received from the slave camera 20 (step S307/YES), the processes of steps S325 and S327 are executed as in steps S225 and S227 of FIG. 6, and the process returns to step S11 of FIG. 5.

When the imaging prohibition instruction is not received from the slave camera 20 (step S307/NO), the control unit 48 executes the processes of steps S309 and S311 in the same manner as steps S209 and S211 of FIG. 6.

When the imaging request is received from the mobile terminal MT1 (step S309/YES), or when the imaging standby time has elapsed (step S311/YES), the control unit 48 transmits the imaging instruction to the slave camera 20 (step S313).

When the control unit 28 of the slave camera 20 receives the imaging instruction from the master camera 40 (FIG. 8: step S405/YES), the control unit 28 drives the driving device 29 to move the cover, thereby exposing the lens of the slave camera 20 and causing the imaging unit 21 to start imaging (step S407).

Thereafter, the control unit 28 waits until an instruction to give notification about distribution is received from the master camera 40 (step S409/NO).

On the other hand, after transmitting the imaging instruction, the control unit 48 of the master camera 40 starts measurement of the distribution standby time (FIG. 7: step S315). Then, the control unit 48 instructs the slave camera 20 to give notification about distribution (step S317).

When the control unit 28 of the slave camera 20 receives the instruction to give notification about distribution from the master camera 40 (FIG. 8: step S409/YES), the control unit 28 gives notification about distribution to the target person TR1 (step S411). For example, the control unit 28 causes the loudspeaker 23 to output a voice such as "Distribution will be started in five seconds", and notifies of the timing at which the distribution of the image is started. Instead of the timing at which the distribution of the image is started, the target person TR1 may be notified of a time until the distribution of the image is started, the fact that the current time is within the distribution standby time, the fact that the current time is in a period in which the distribution can be prohibited, or the like. This allows the target person TR1 to know the timing at which the distribution of the image is started, the time until the distribution of the image is started, the fact that the distribution of the image is not yet performed, or the fact that the distribution can be prohibited.

Then, the control unit 28 determines whether an input to prohibit distribution of an image has been received (step S413). For example, the control unit 28 performs voice recognition processing on the sound input from the microphone 22, and determines whether the input sound includes a predetermined voice for prohibiting distribution of the image. When the predetermined voice is included, the control unit 28 determines that the input to prohibit the distribution of the image is received.

When the input to prohibit the distribution of the image is received (step S413/YES), the control unit 28 transmits information (distribution prohibition instruction) indicating that the input to prohibit the distribution is received to the master camera 40 (step S425).

The control unit 28 stops the imaging of the target person TR1 by the imaging unit 21 (step S417), drives the driving device 29 to cover the lens of the slave camera 20 with the cover (step S419), and ends the process of FIG. 8. When images are recorded in the storage unit 24, the recorded images may be deleted. This makes it possible to further protect the privacy of the target person TR1.

On the other hand, the control unit 48 of the master camera 40 determines whether the distribution prohibition instruction is received from the slave camera 20 (FIG. 7: step S319). When the distribution prohibition instruction is received from the slave camera 20 (step S319/YES), the control unit 48 transmits a predetermined message to the mobile terminal MT1 (step S329). For example, the control unit 48 transmits a message reporting that the abnormality is erroneously detected or that there is no abnormality in the target person TR1. This allows the person OB1 carrying the mobile terminal MT1 (the observer of the target person TR1) to know that the target person TR1 is safe.

Then, the control unit 48 stops the measurement of the distribution standby time (step S331). This prevents images from being distributed, thus preventing the image of the target person TR1 from being distributed even though no abnormality has occurred in the target person TR1, thereby protecting the privacy of the target person TR1. Thereafter, the process returns to step S11 in FIG. 5.

When the distribution prohibition instruction is not received from the slave camera 20 (step S319/NO), the control unit 48 determines whether the distribution standby time has elapsed (step S321). When the distribution standby time has not elapsed (step S321/NO), the process returns to step S319.

When the distribution standby time has elapsed (step S321/YES), the control unit 48 instructs the slave camera 20 to continue capturing the image including target person TR1 (step S323), and starts distribution of the image including the target person TR1 (step S324).

On the other hand, in FIG. 8, when the input to prohibit the distribution is not received (step S413/NO), the control unit 28 of the slave camera 20 determines whether an instruction to continue imaging is received from the master camera 40 (step S415). When the instruction to continue imaging is not received (step S415/NO), the process returns to step S413.

When the instruction to continue imaging is received (step S415/YES), the control unit 28 causes the imaging unit 21 to continue capturing the image including the target person TR1 (step S416), and ends the process of FIG. 8.

Next, an example of a process executed in the watching system 100 will be described with reference to time charts FIG. 9A to FIG. 9D. In FIG. 9A to FIG. 9D, the vertical axis represents time.

Figure 9A:
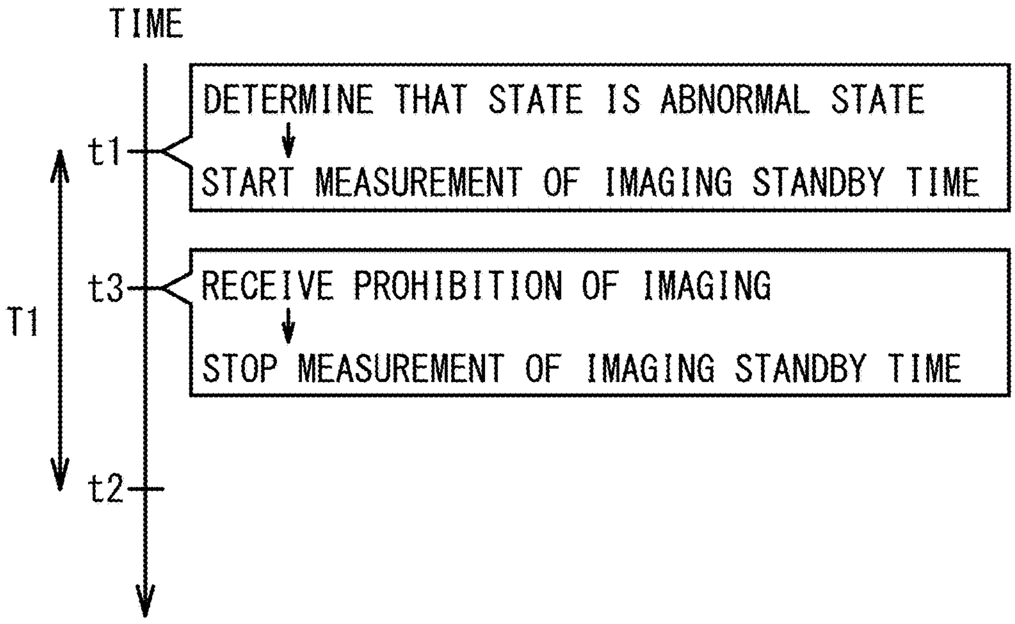
FIG. 9A to FIG. 9D are time charts illustrating an example of a process executed in the watching system according to the first embodiment.

First, the example of FIG. 9A will be described. In FIG. 9A, it is assumed that the control unit 48 determines that an abnormality has occurred in the target person TR1 at a time t1. In this case, the control unit 48 starts measurement of the imaging standby time at time t1.

Here, when an input to prohibit imaging is received at time t3 before time t2 at which the imaging standby time T1 elapses, the control unit 48 stops the measurement of the imaging standby time. Therefore, in the example of FIG. 9A, the image including the target person TR1 is not captured, and it is possible to prevent the image from being captured even though no abnormality has occurred in the target person TR1.

Figure 9B:
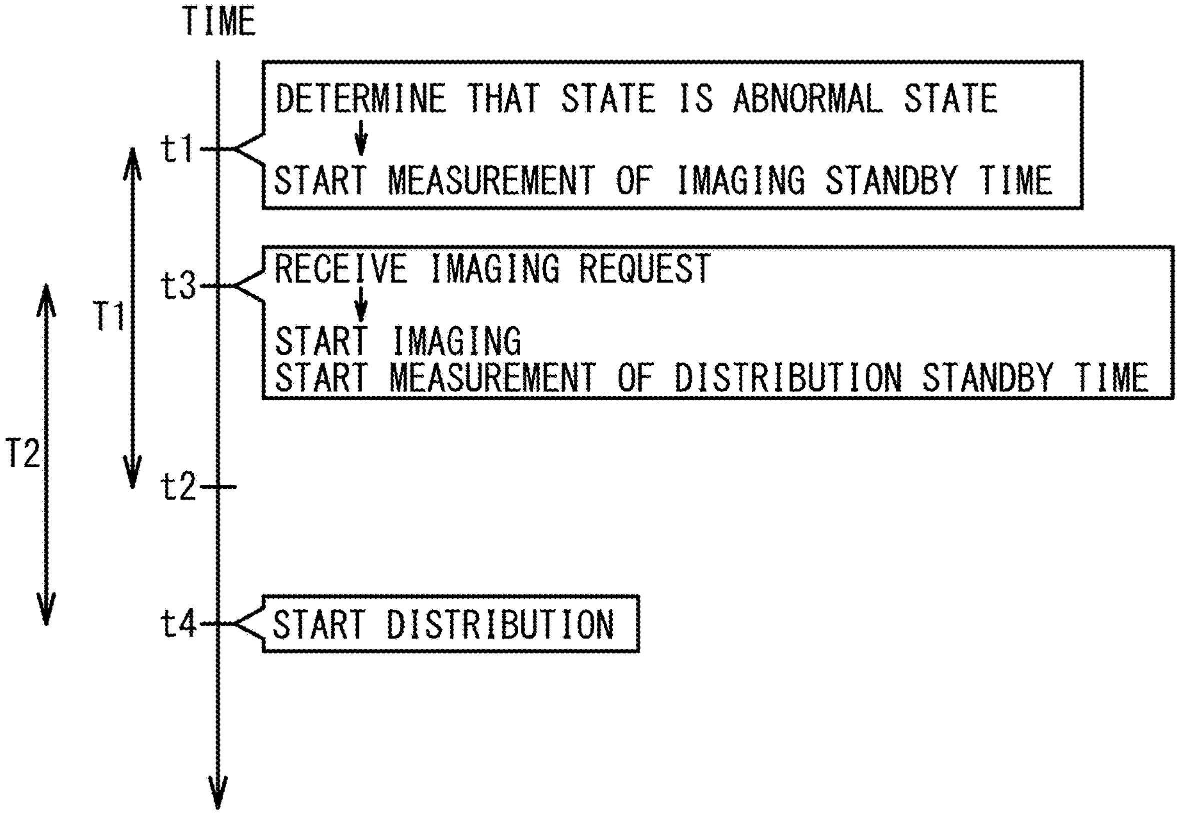

Next, the example of FIG. 9B will be described. In FIG. 9B, it is assumed that the control unit 48 determines that an abnormality has occurred in the target person TR1 at time t1. In this case, the control unit 48 starts the measurement of the imaging standby time at time t1.

When the imaging request is received at time t3 before time t2 at which the imaging standby time T1 elapses, the imaging unit 21 or 41 starts capturing an image including the target person TR1, and the control unit 48 starts measurement of the distribution standby time.

When the distribution standby time T2 elapses at time t4, the control unit 48 starts distribution of images. In the example of FIG. 9B, images including the target person TR1 are distributed to the mobile terminal MT1 after time t4.

Figure 9C:
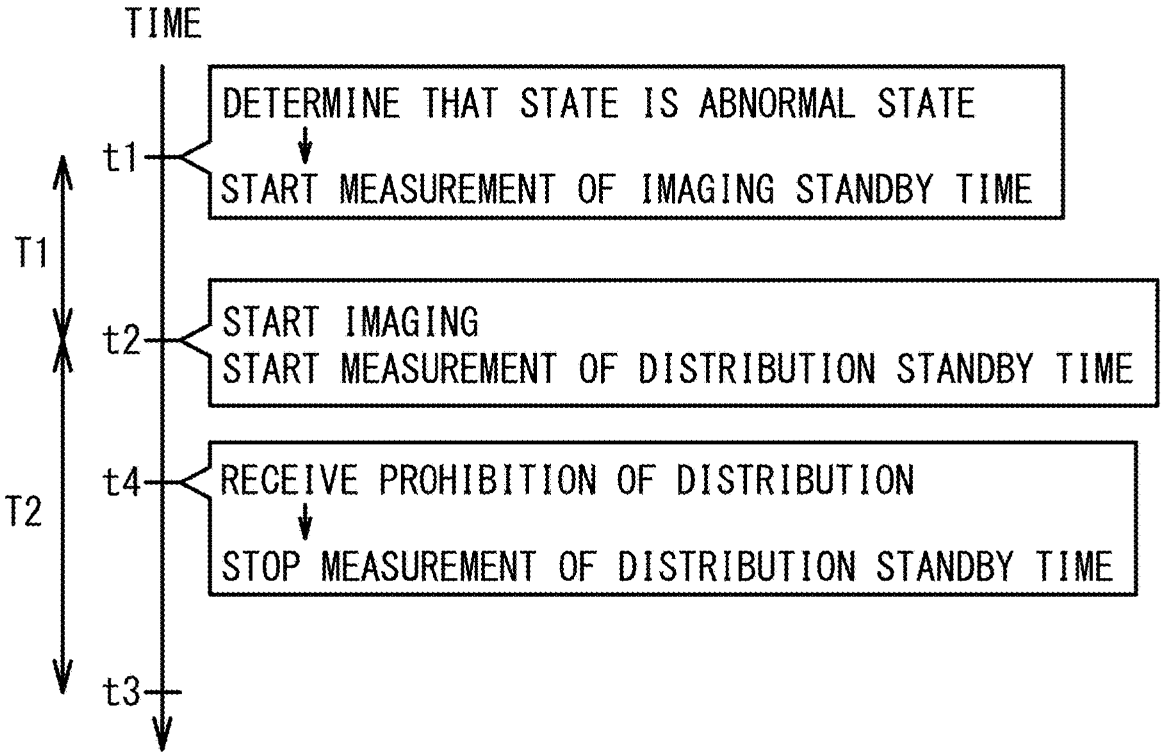

Next, an example illustrated in FIG. 9C will be described. In FIG. 9C, it is assumed that the control unit 48 determines that an abnormality has occurred in the target person TR1 at time t1. In this case, the control unit 48 starts measurement of the imaging standby time at time t1.

When the imaging standby time T1 has elapsed at time t2, the imaging unit 21 or 41 starts capturing of images including the target person TR1, and the control unit 48 starts measurement of the distribution standby time.

When receiving an input to prohibit distribution at time t4 before time t3 at which the distribution standby time T2 elapses, the control unit 48 stops the measurement of the distribution standby time. Therefore, in the example of FIG. 9C, the image including the target person TR1 is not distributed to the mobile terminal MT1, and it is possible to prevent the image from being distributed even though no abnormality has occurred in the target person TR1.

Figure 9D:
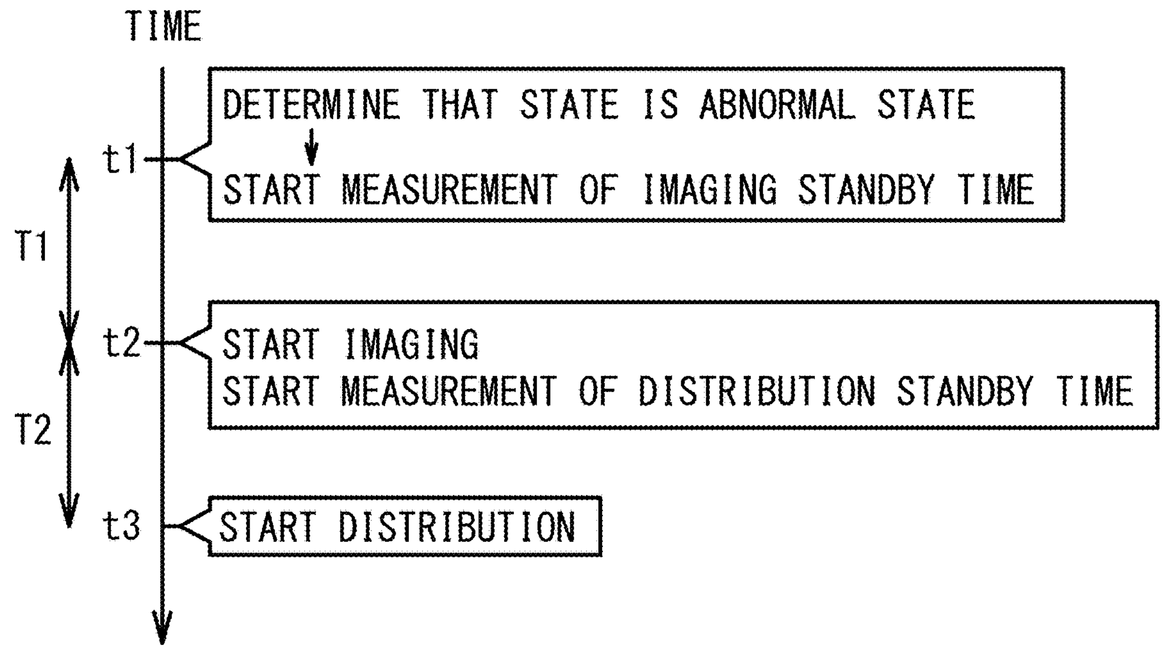

Next, an example illustrated in FIG. 9D is described. In FIG. 9D, it is assumed that the control unit 48 determines that an abnormality has occurred in the target person TR1 at time t1. In this case, the control unit 48 starts measurement of the imaging standby time at time t1.

When the imaging standby time T1 has elapsed at time t2, the imaging unit 21 or 41 starts capturing of images including the target person TR1, and the control unit 48 starts measurement of the distribution standby time.

When the distribution standby time T2 has elapsed at time t3, the control unit 48 starts distribution of images. In the example of FIG. 9D, images including the target person TR1 are distributed to the mobile terminal MT1 after time t3.

As described above in detail, according to the first embodiment, the watching system 100 includes the sensor 10 that acquires data on the state of the target person TR1, the master camera 40 and the slave camera 20 that start capturing an image including the target person TR1 when the state of the target person TR1 is a predetermined state (a state in which an abnormality has occurred in the target person TR1), and the control unit 48 and the control unit 28 that make the master camera 40 and the slave camera 20 unable to capture images of the target person TR1 until the state of the target person TR1 becomes the predetermined state. This allows the target person TR1 not to be imaged during normal times, and thus the privacy of the target person TR1 can be protected.

In the first embodiment, the master camera 40 and the slave camera 20 have different appearances between a state in which the imaging of the target person TR1 is not possible and a state in which the imaging of the target person TR1 is possible (see FIG. 4A to FIG. 4D). This allows the target person TR1 to determine whether the master camera 40 and the slave camera 20 are capturing images by checking the appearances of the master camera 40 and the slave camera 20.

In the first embodiment, in a state where the master camera 40 and the slave camera 20 cannot capture the image of the target person TR1, the lenses of the master camera 40 and the slave camera 20 are not visible from the target person TR1. For example, the control unit 48 keeps the lens 421 of the master camera 40 covered with the cover 422 until the state of the target person TR1 becomes the predetermined state (until an abnormality has occurred in the target person TR1). This can prevent the target person TR1 from having a sense of "being monitored".

As described above, the control units 48 and 28 may set the imaging directions of the master camera 40 and the slave camera 20 to directions different from the direction in which the preset imaging range is present until the state of the target person TR1 becomes the predetermined state. In this manner, it is also possible to inhibit the target person TR1 from having a sense of "being monitored".

In the first embodiment, the sensor 10 acquires data other than the visible light image as data on the state of the target person. Thus, it is possible to determine whether an abnormality has occurred in the target person TR1 while protecting the privacy of the target person TR1.

In the first embodiment, the control unit 48 causes the imaging unit 21 or 41 to start capturing an image including the target person TR1 when the imaging standby time (first predetermined time) has elapsed since the state of the target person TR1 estimated from data acquired by the sensor 10 that acquires data on the state of the target person TR1 becomes the predetermined state (a state in which an abnormality has occurred in the target person TR1). Since there is a time lag from the determination that an abnormality has occurred in the target person TR1 to the start of image capturing, when no abnormality has actually occurred in the target person TR1, actions for protecting the privacy of the target person TR1 can be taken. Therefore, the privacy of the target person TR1 can be protected as compared with a case where the imaging is started immediately after it is determined that an abnormality has occurred in the target person TR1.

In the first embodiment, when receiving an input to prohibit (cancel) imaging within the imaging standby time, the control unit 48 does not perform the process of causing the imaging unit 21 or 41 to capture images. Thus, for example, when no abnormality actually has occurred in the target person TR1, the imaging unit 21 or 41 can be prohibited from capturing an image including the target person TR1, and the privacy of the target person TR1 can be protected.

In the first embodiment, when receiving an input to prohibit imaging, the control unit 48 transmits a predetermined message (for example, a message reporting that an abnormality was erroneously detected or that no abnormality has occurred) to the mobile terminal (external device) MT1. This allows the person OB1 who carries the mobile terminal MT1 (the observer of the target person TR1) to know that the target person TR1 is safe.

In the first embodiment, when it is determined that an abnormality has occurred in the target person TR1, the control unit 48 gives notification about the start of imaging to the target person TR1. Specifically, in the first embodiment, the target person TR1 is notified of the timing at which the imaging is started. Thus, the target person TR1 can know the timing at which the imaging is started, and can take a necessary action for protecting privacy (for example, prohibiting the imaging, moving out of the imaging range, or the like) when no abnormality has occurred in the target person TR1, and thus, the privacy of the target person TR1 can be protected compared to a case where the notification about the start of imaging is not given. In the above embodiment, the notification is given by the loudspeaker 43 included in the master camera 40 or the loudspeaker 23 included in the slave camera 20, but this does not intend to suggest any limitation. For example, the remote controller 30 may include a loudspeaker, and the notification may be given through the loudspeaker of the remote controller 30. The remote controller 30 may include a display unit and display the notification on the display unit.

In the first embodiment, when the estimated state of the target person TR1 becomes the predetermined state (a state in which an abnormality has occurred in the target person TR1), the control unit 48 transmits a notification about the target person TR1 to the mobile terminal MT1. Specifically, a message reporting that there is a possibility that an abnormality has occurred in the target person TR1 is transmitted to the mobile terminal MT1. This allows the person OB1 who carries the mobile terminal MT1 to know that an abnormality has occurred in the target person TR1 and to take actions such as calling the target person TR1 or visiting the target person TR1.

In the first embodiment, when an imaging request is received from the mobile terminal MT1 within the imaging standby time, the control unit 48 causes the imaging unit 21 or the imaging unit 41 to start imaging before the imaging standby time elapses. This allows the image of the target person TR1 to be stored at the request of the observer OB1 who carries the mobile terminal MT1. When the imaging unit 21 or the imaging unit 41 is caused to start imaging, the target person TR1 may be notified that imaging is started.

In the first embodiment, the control unit 48 distributes the images captured by the imaging unit 21 or 41 when the distribution standby time (second predetermined time) elapses after the imaging unit 21 or 41 starts imaging. Since there is a time lag from the start of imaging to the distribution of the image, the target person TR1 can take a necessary action during the distribution standby time when no abnormality has occurred in the target person TR1. This protects the privacy of the target person TR1 compared to the case where distribution of images is started immediately after the imaging unit 21 or 41 starts imaging. In addition, when an abnormality has occurred in the target person TR1, the image captured by the imaging unit 21 or 41 is distributed after the distribution standby time elapses, and thus the person OB1 who carries the mobile terminal MT1 can check the state of the target person TR1 by the image.

In the first embodiment, when an input to prohibit (cancel) distribution is received within the distribution standby time (second predetermined time), the control unit 48 stops the measurement of the distribution standby time. This prevents the image captured by the imaging unit 21 or 41 from being distributed, thus preventing a situation in which the image is distributed and the privacy of the target person TR1 is violated when no abnormality has occurred in the target person TR1.

In the first embodiment, the control unit 48 notifies the target person TR1 of the distribution of the image before the process of distributing the image. This allows the target person TR1 to know that the image is to be distributed, and can take an action necessary for protecting privacy.

In the first embodiment, the control unit 48 gives notification about the start of capturing of the image including the target person TR1 when the state of the target person TR1 estimated from the data acquired by the sensor 10 that acquires data on the state of the target person TR1 becomes a predetermined state (a state in which an abnormality has occurred in the target person TR1). This allows the target person TR1 to know that the imaging is to be started, and therefore, for example, when no abnormality has occurred in the target person TR1, the target person TR1 can take an action necessary for protecting the privacy.

In the first embodiment, when the imaging standby time (first predetermined time) elapses after the state of the target person TR1 becomes the predetermined state, the control unit 48 causes the imaging unit 41 or the imaging unit 21 to start imaging, and notifies of the timing of start of imaging during the imaging standby time. Thus, for example, when no abnormality has occurred in the target person TR1, the target person TR1 can take an action necessary for protecting the privacy of the target person TR1 by the timing at which the imaging is started.

As described above, the control unit 48 may notify that the current time is within the imaging standby time or before the imaging unit 21 or 41 starts imaging. Such notifications also allow the target person TR1 to take the necessary actions to protect the privacy of the target person TR1, for example, when no abnormality has occurred in the target person TR1.

The control unit 48 may notify of the time until the imaging is started. Even with such a notification, for example, when no abnormality has occurred in the target person TR1, the target person TR1 can take an action necessary for protecting the privacy of the target person TR1.

The control unit 48 may notify that the current time is within a period during which imaging can be prohibited. This allows the target person TR1 to take an action necessary for prohibiting imaging, for example, when no abnormality has occurred in the target person TR1.

In the first embodiment, the control unit 48 starts distribution of an image captured by the imaging unit 21 or 41 after the imaging unit 21 or 41 starts capturing an image, and gives notification about the distribution of the image before the distribution of the image is started. This allows the target person TR1 to know that the distribution of the image is to be started, and therefore, for example, when no abnormality has occurred in the target person TR1, the target person TR1 can take an action necessary for protecting the privacy of the target person TR1.

In the first embodiment, when the distribution standby time elapses after the imaging unit 21 or 41 starts capturing images including the target person TR1, the control unit 48 starts distribution of the captured images and notifies of the timing of start of distribution during the distribution standby time. This allows, for example, when no abnormality has occurred in the target person TR1, the target person TR1 to take an action necessary for protecting the privacy of the target person TR1 by the timing at which the distribution of the image is started.

The control unit 48 may notify of the time until the distribution is started. Such notifications also allow the target person TR1 to take necessary actions to protect the privacy of the target person TR1, for example, when no abnormality has occurred in the target person TR1.

The control unit 48 may notify that the current time is within a period during which distribution can be prohibited (canceled) This allows the target person TR1 to know that the distribution can be prohibited, and can take an action necessary for protecting the privacy of the target person TR1.

In the first embodiment, when the control unit 48 receives an input to prohibit imaging within the imaging standby time, the control unit 48 does not perform the process for starting image capturing. The fact that the input to prohibit imaging is received is considered to mean that the target person TR1 is in a state in which he/she can perform an input to prohibit imaging, that is, a state in which no abnormality has occurred. Therefore, when an input to prohibit imaging is received within the imaging standby time, the process for starting image capturing is not performed, and thus it is possible to protect the privacy of the target person TR1 who is highly likely to have no abnormality.

In the first embodiment, when the control unit 48 receives an input to prohibit distribution within the distribution standby time, the control unit 48 does not perform the process of starting distribution of images. The fact that the input to prohibit the distribution is received is considered to mean that the target person TR1 is in a state where he/she can make an input to prohibit the distribution, that is, a state where no abnormality has occurred. Therefore, when an input to prohibit distribution is received, the process for starting distribution of images is not performed, and thus it is possible to protect the privacy of the target person TR1 who is highly likely to have no abnormality.

Second Embodiment

In the first embodiment, it is determined whether the state of the target person TR1 estimated based on the date acquired from the sensor 10 is the predetermined state (the state in which an abnormality has occurred in the target person TR1). In the first embodiment, when the determination is incorrect, if the target person TR1 does not notice the notification about imaging or the notification about distribution and does not perform any of the input to prohibit imaging and the input to prohibit distribution, the imaging and distribution of the image are performed, and the privacy of the target person TR1 may not be protected.

Therefore, in the second embodiment, it is determined whether the determination that "an abnormality has occurred in the target person" based on the data acquired from the sensor 10 is correct, based on the image captured by the imaging unit 21 or 41. Specifically, the state of the target person TR1 is estimated based on the image captured by the imaging unit 21 or 41, and when the estimated state of the target person TR1 is a predetermined state (a state where an abnormality has occurred in the target person TR1), the determination of the abnormality based on the data acquired from the sensor 10 is determined to be correct, and the measurement of the distribution standby time is started. This is because the amount of information obtained from the image captured by the imaging unit 21 or 41 is generally larger than the amount of information obtained from the sensor 10, and thus the state of the target person TR1 estimated from the image captured by the imaging unit 21 or 41 is considered to have higher estimation accuracy than the state of the target person TR1 estimated from the data acquired by the sensor 10.

In the second embodiment, the processes executed by the control unit 28 and the control unit 48 are different from those in the first embodiment. The configuration of the watching system 100, the configuration of the master camera 40, and the configuration of the slave camera 20 are the same as those in the first embodiment, and thus detailed description thereof will be omitted.

Figure 10:
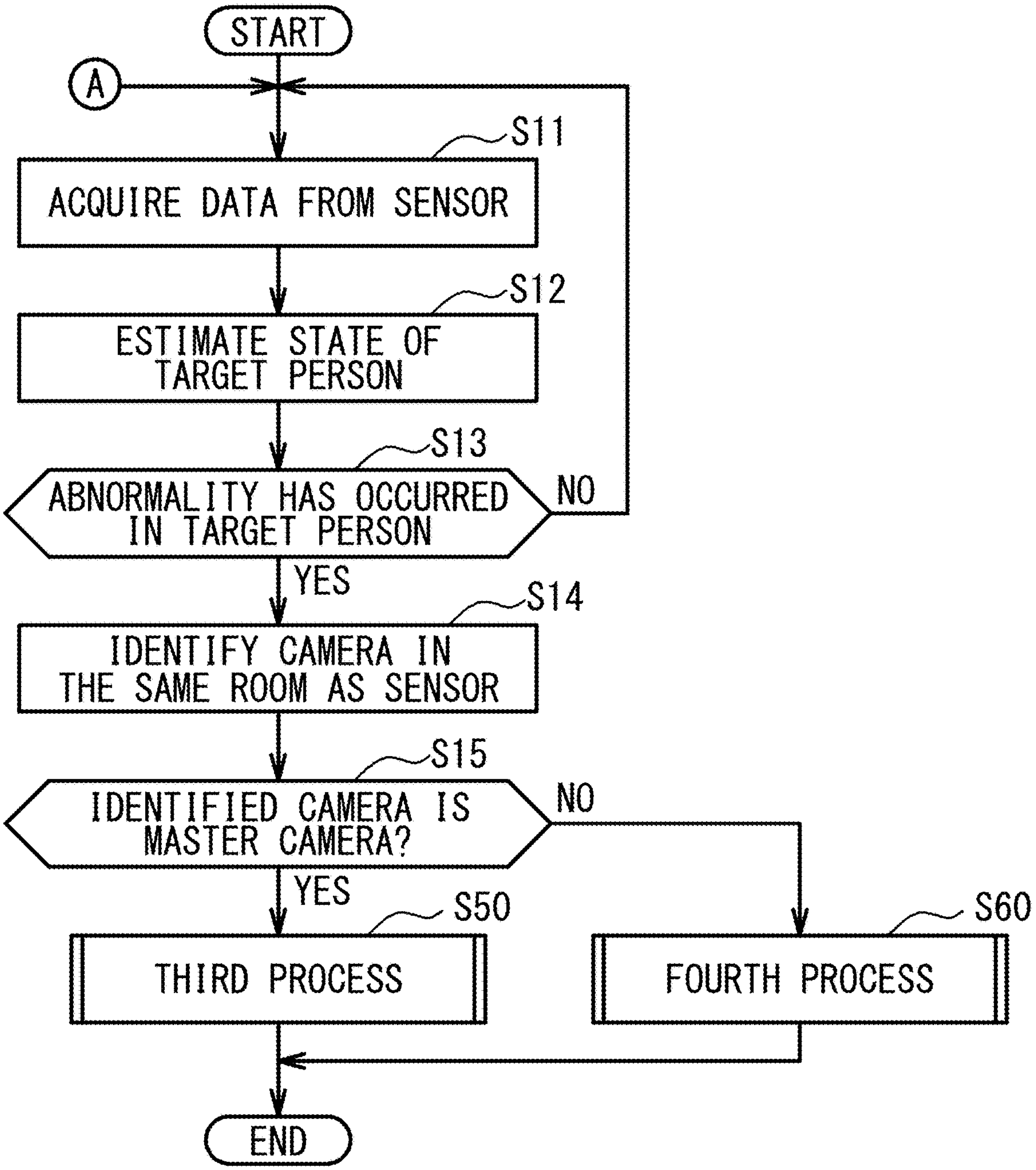
FIG. 10 is a flowchart illustrating an example of a process executed by the control unit of the master camera in a watching system according to a second embodiment.

FIG. 10 is a flowchart illustrating an example of a process executed by the control unit 48 of the master camera 40 in the watching system 100 according to the second embodiment. The process of FIG. 10 is different from the process of FIG. 5 in the process (step S50: third process) executed when the camera identified in step S14 is the master camera 40 (step S15/YES) and the process (step S60: fourth process) executed when the camera identified in step S14 is the slave camera 20 (step S15/NO).

Figure 11:
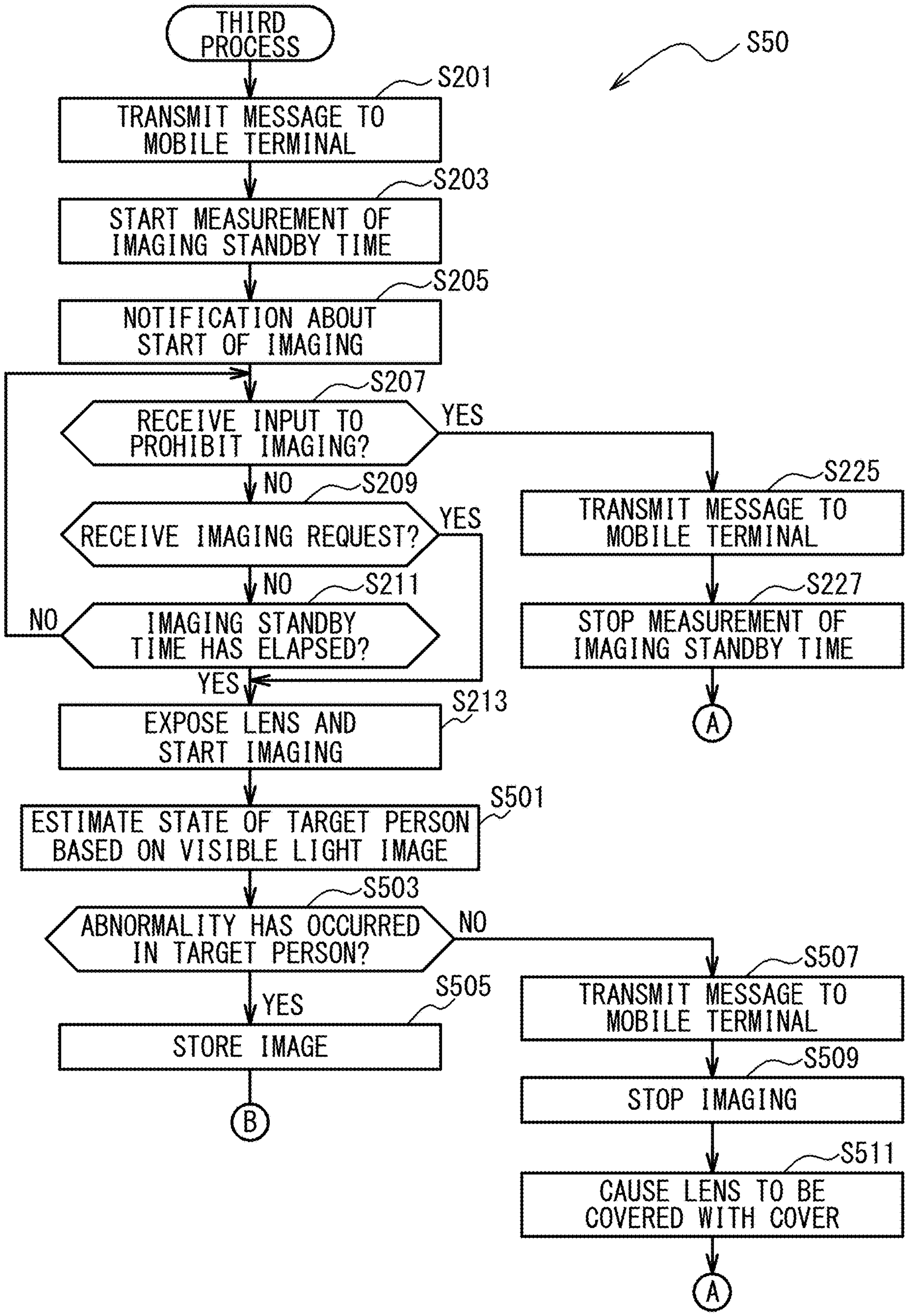
FIG. 11 is a flowchart (part 1) illustrating details of a third process.
Figure 12:
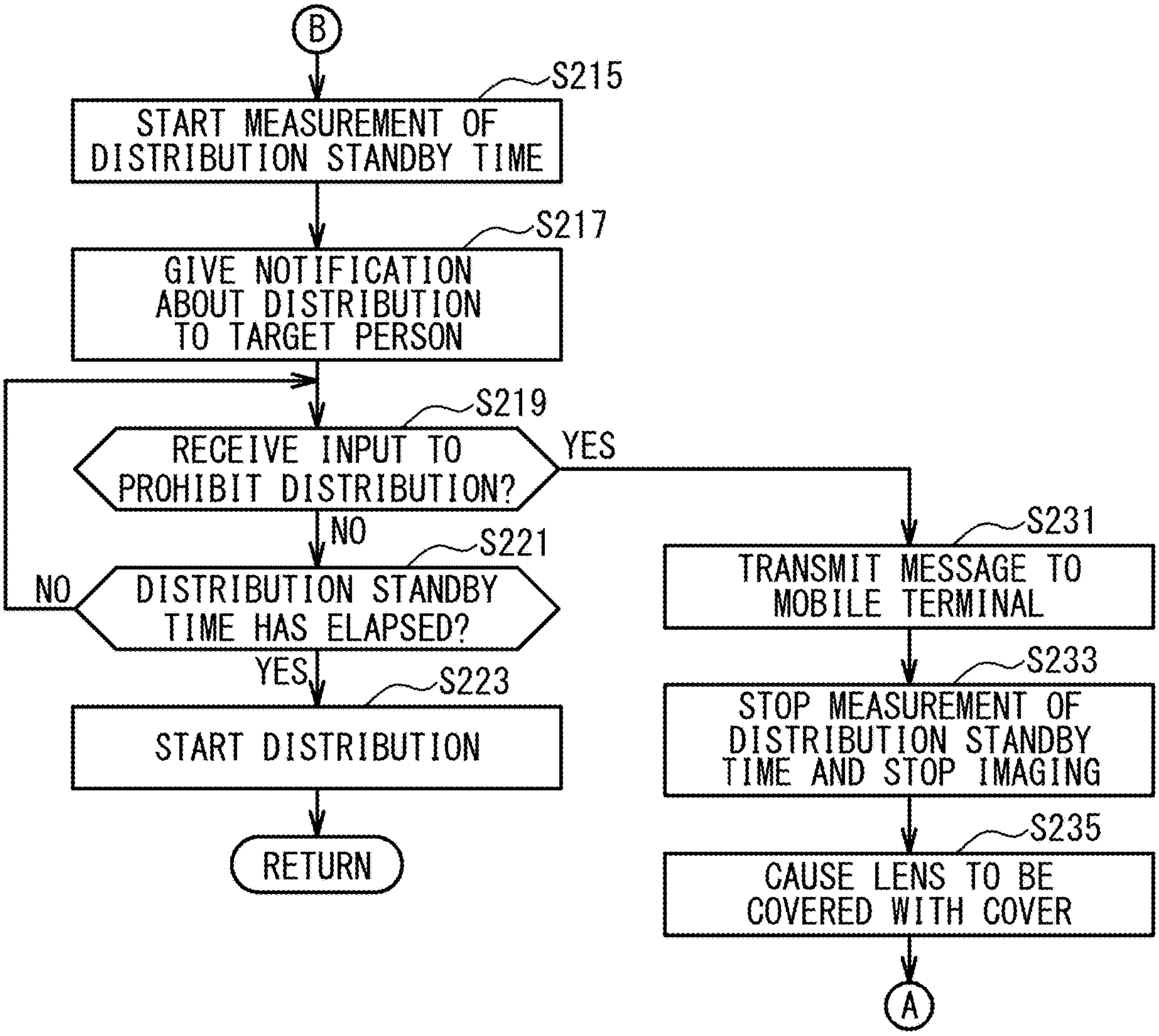
FIG. 12 is a flowchart (part 2) illustrating the details of the third process.

FIG. 11 and FIG. 12 are flowcharts illustrating details of the third process. In FIG. 11, the processes of steps S201 to S213 and steps S225 and S227 are the same as those of the first process illustrated in FIG. 6, and thus are denoted by the same symbols and will not be described in detail.

In the third process, when the imaging unit 41 starts imaging (step S213), the control unit 48 estimates the state of the target person TR1 on the basis of the image (visible light image) captured by the imaging unit 41 (step S501). Then, the control unit 48 determines whether the estimated state of the target person TR1 is a predetermined state (a state in which an abnormality has occurred in the target person TR1) (step S503). For example, the control unit 48 performs pattern matching between the image captured by the imaging unit 41 and an image registered in advance and used for abnormality determination, and determines whether an abnormality has occurred in the target person TR1.

When no abnormality has occurred in the target person TR1 (step S503/NO), the control unit 48 transmits a predetermined message to the mobile terminal MT1 (step S507). For example, the control unit 48 transmits a message reporting that the determination in step S13 of FIG. 10 is erroneous (erroneous determination/erroneous detection) or that there is no abnormality in the target person TR1.

Then, the control unit 48 stops the imaging by the imaging unit 41 (step S509), and moves the cover 422 so that the cover 422 covers the lens 421 by driving the driving device 49 (step S511). The order of the processes of steps S507 to S511 may be changed. After step S511, the process returns to step S11 in FIG. 10.

When it is determined that an abnormality has occurred in the target person TR1 (step S503/YES), the control unit 48 stores the image used for estimating the state of the target person TR1 in the storage unit 44 (step S505). This allows the observer OB1 of the target person TR1 to check and verify the image used for determining whether an abnormality has occurred in the target person TR1 later. The image used for determining whether an abnormality has occurred in the target person TR1 may be distributed to the mobile terminal MT1 after the distribution standby time has elapsed.

The processes after step S215 in FIG. 12 are the same as the processes after step S215 in the first process illustrated in FIG. 6, and therefore, the same symbols are used and detailed description is omitted.

Figure 13A:
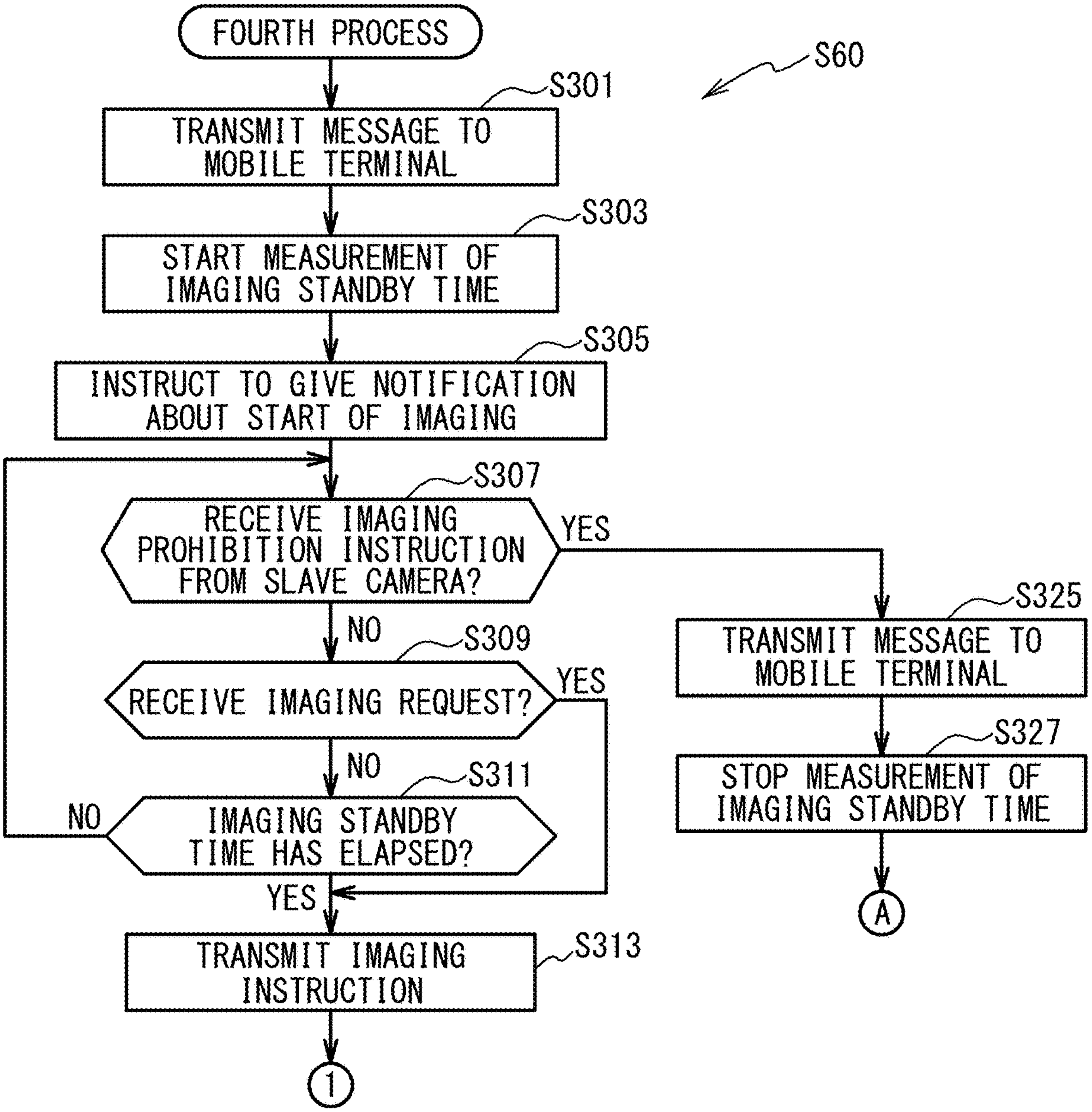
FIG. 13A and FIG. 13B are flowcharts illustrating details of a fourth process.
Figure 13B:
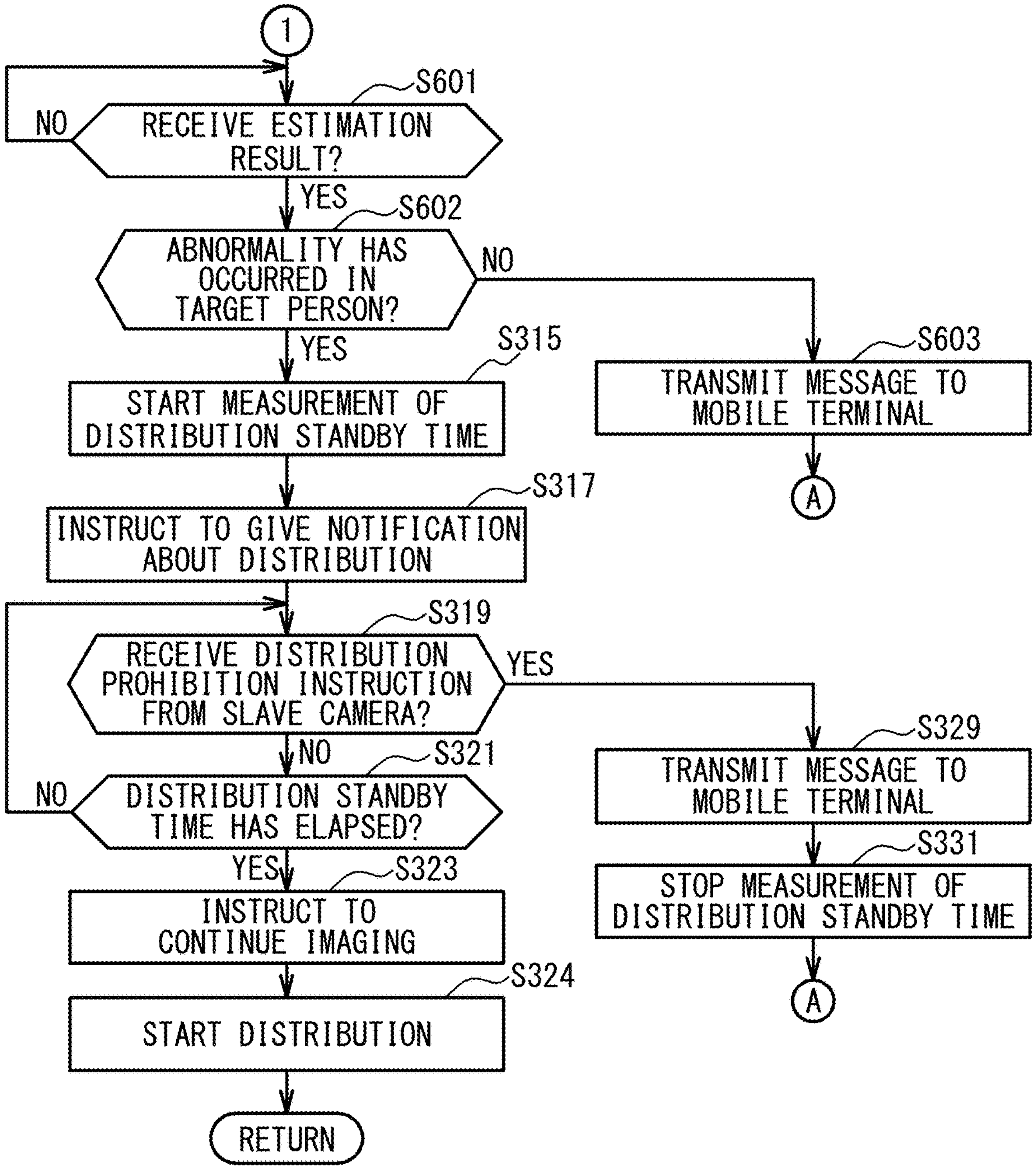
Figure 14A:
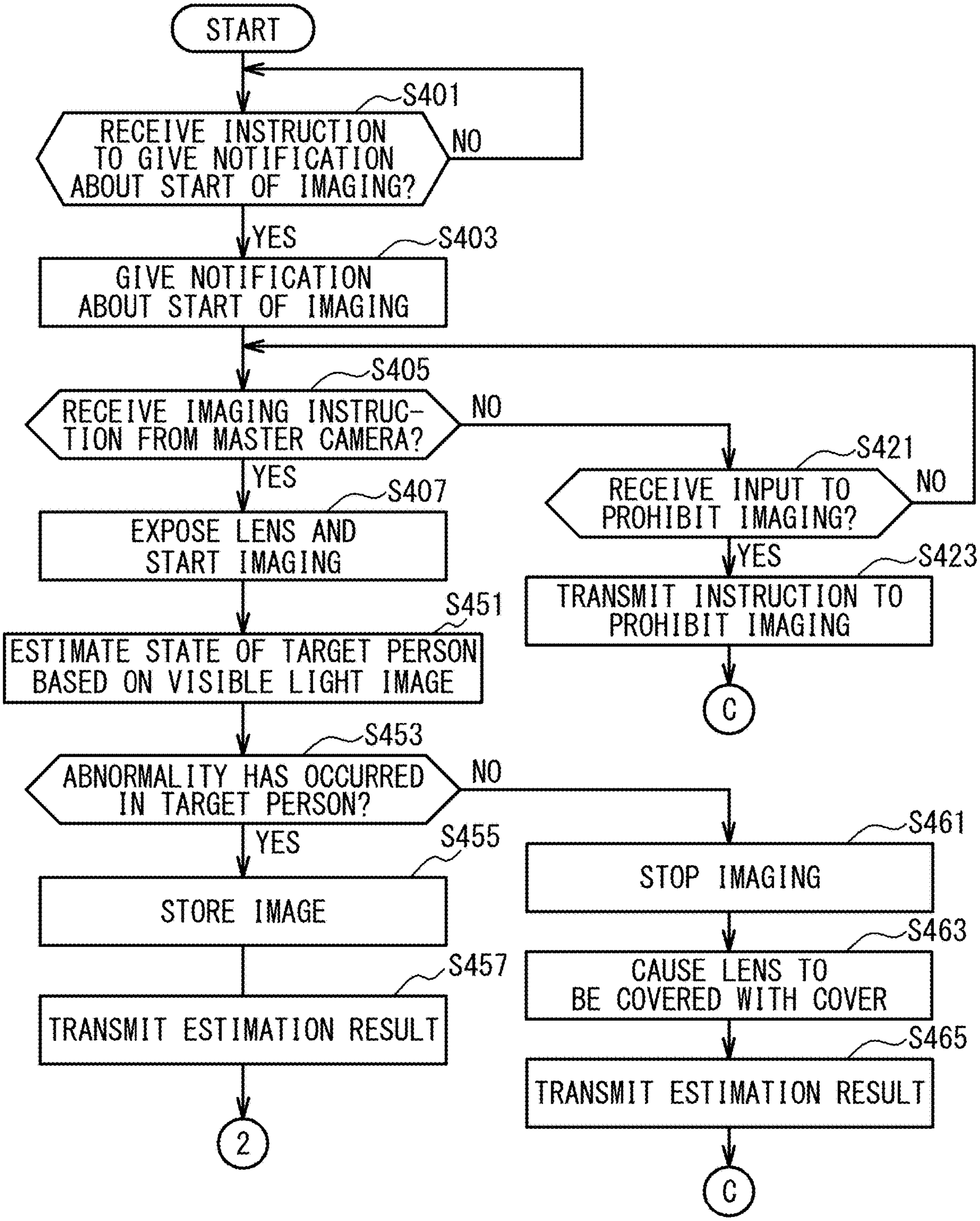
FIG. 14A and FIG. 14B are flowcharts illustrating an example of a process executed by the control unit of the slave camera in the watching system according to the second embodiment.
Figure 14B:
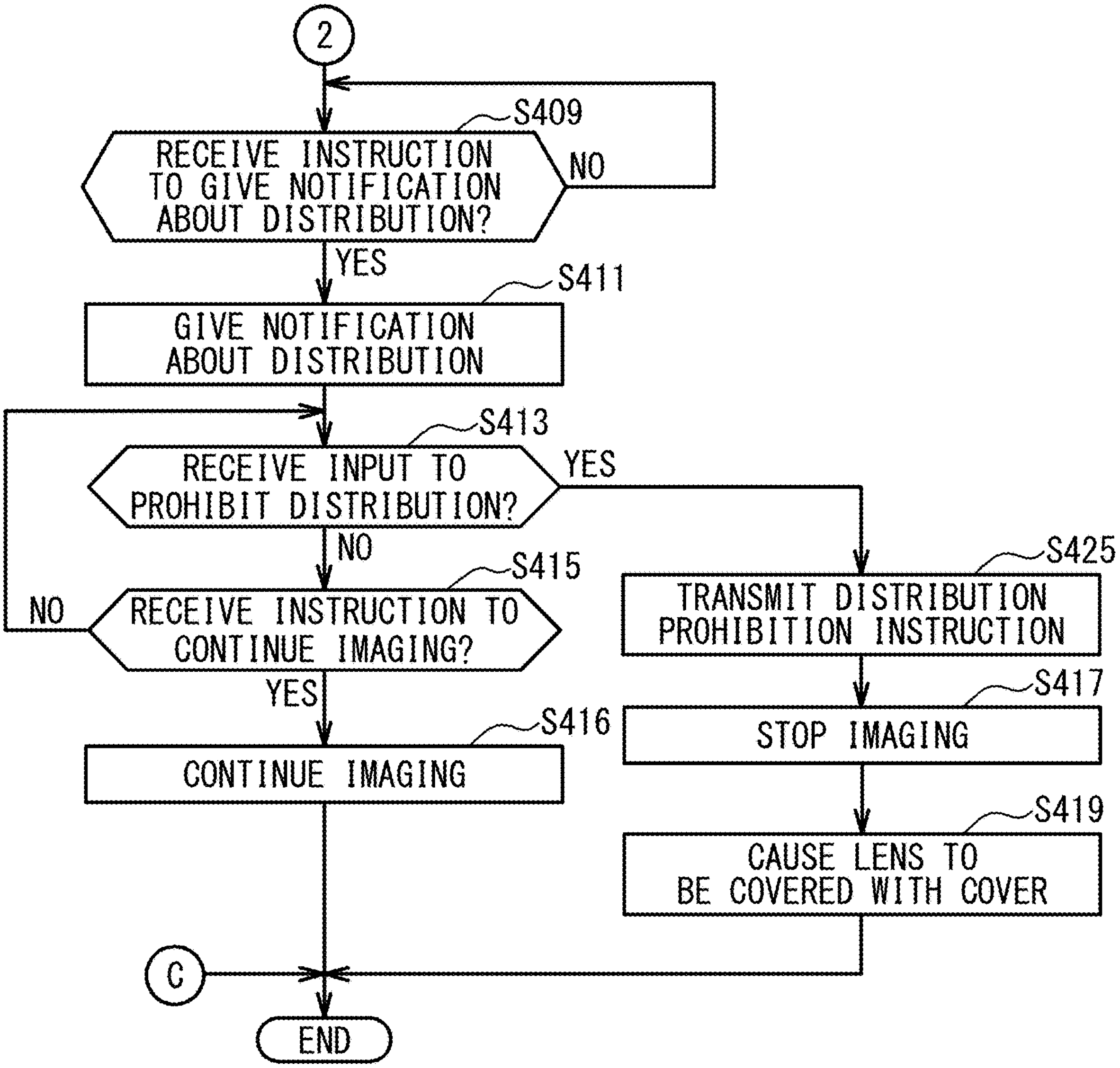

Next, the fourth process will be described in detail. FIG. 13A and FIG. 13B are flowcharts illustrating details of the fourth process. FIG. 14A and FIG. 14B are flowcharts illustrating an example of a process executed by the control unit 28 of the slave camera 20 in the watching system 100 according to the second embodiment. The fourth process will be described together with the process executed by the control unit 28 of the slave camera 20.

In the fourth process illustrated in FIG. 13A and FIG. 13B, the processes of steps S301 to S313 and steps S325 and S327 are the same processes as those in the second process illustrated in FIG. 7, and thus the same symbols are used and detailed description thereof will be omitted.

In the process executed by the control unit 28 of the slave camera 20 illustrated in FIG. 14A and FIG. 14B, the processes of steps S401 to S407 and steps S421 and S423 are the same as the processes illustrated in FIG. 8, and therefore, the same symbols are used and detailed descriptions thereof are omitted.

In FIG. 14A, when the control unit 28 of the slave camera 20 causes the imaging unit 21 to start capturing an image including the target person TR1 (step S407), the control unit 28 estimates the state of the target person TR1 based on the image (visible light image) captured by the imaging unit 21 (step S451). Then, the control unit 28 determines whether the estimated state of the target person TR1 is a predetermined state (a state in which an abnormality has occurred in the target person TR1) (step S453).

When no abnormality has occurred in the target person TR1 (step S453/NO), the control unit 28 stops image capturing by the imaging unit 21 (step S461), and covers the lens of the slave camera 20 with the cover (step S463). Then, the control unit 28 transmits the estimation result of the state of the target person TR1 to the master camera 40 (step S465), and ends the process of FIG. 14A and FIG. 14B. In step S465, the estimation result that no abnormality has occurred in the target person TR1 is transmitted to the master camera 40.

On the other hand, when an abnormality has occurred in the target person TR1 (step S453/YES), the control unit 28 stores the image used for the estimation of the state of the target person TR1 in the storage unit 24 (step S455). This allows the observer OB1 of the target person TR1 to check and verify the image used for determining whether an abnormality has occurred in the target person TR1 later. The image used for determining whether an abnormality has occurred in the target person TR1 may be distributed to the mobile terminal MT1 after the distribution standby time has elapsed.

The control unit 28 transmits the estimation result of the state of the target person TR1 to the master camera 40 (step S457), and waits until an instruction to give notification about distribution is received (step S409). In step S457, the estimation result that an abnormality has occurred in the target person TR1 is transmitted to the master camera 40.

The processes in and after step S409 are the same as the processes illustrated in FIG. 8, and therefore, the same symbols are used and detailed description is omitted.

On the other hand, after transmitting the imaging instruction to the slave camera 20 (FIG. 13A: step S313), the control unit 48 of the master camera 40 waits until the control unit 48 receives the estimation result of the state of the target person TR1 based on the visible light image from the slave camera 20 (step S601/NO).

When the estimation result is received (step S601/YES), the control unit 48 determines whether the estimation result is a result indicating that an abnormality has occurred in the target person TR1 (step S602).

When no abnormality has occurred in the target person TR1 (step S602/NO), the control unit 48 transmits a predetermined message to the mobile terminal MT1 (step S603). For example, the control unit 48 transmits a message reporting that the determination in step S13 of FIG. 10 is erroneous (erroneous determination/erroneous detection) or that there is no abnormality in the target person TR1.

When an abnormality has occurred in the target person TR1 (step S602/YES), the control unit 48 starts measurement of the distribution standby time (step S315). The processes in and after step S315 are the same as those of the second process illustrated in FIG. 7, and therefore, the same symbols are used and detailed description is omitted.

Figure 15A:
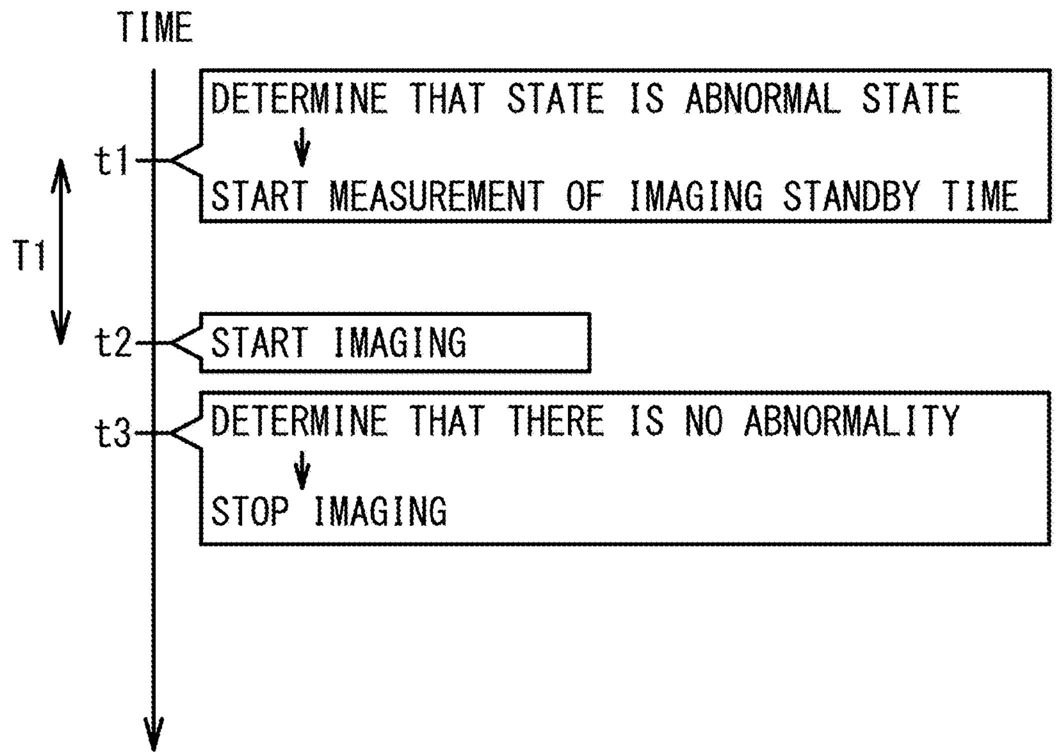
FIG. 15A and FIG. 15B are time charts illustrating an example of a process executed in the watching system according to the second embodiment.
Figure 15B:
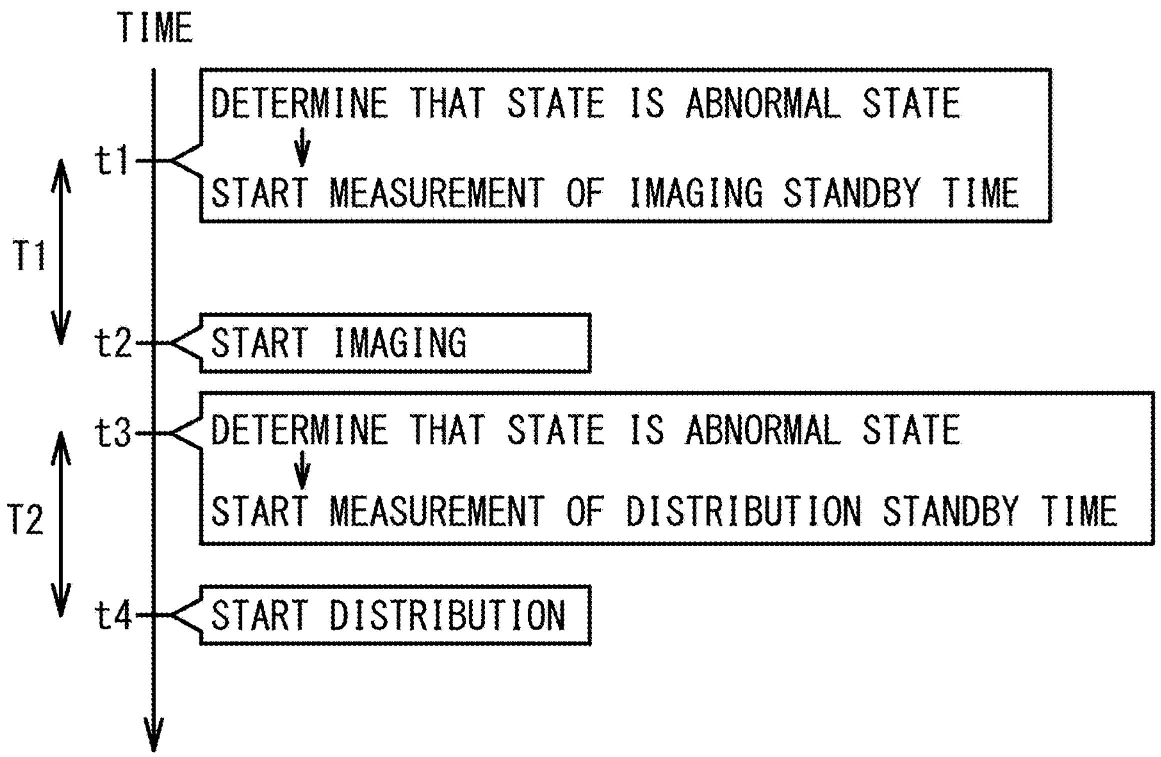

FIG. 15A and FIG. 15B are time charts illustrating an example of a process executed in the watching system 100 according to the second embodiment.

First, an example of FIG. 15A will be described. In FIG. 15A, it is assumed that the control unit 48 determines that an abnormality has occurred in the target person TR1 based on the data acquired from the sensor 10, at time t1.

In this case, the control unit 48 starts measurement of the imaging standby time from time t1. When the imaging standby time T1 elapses at time t2, the imaging unit 21 or 41 starts capturing of an image including the target person TR1.

At time t3, when the control unit 28 or 48 determines that no abnormality has occurred in the target person TR1 based on the captured image, the imaging by the imaging unit 21 or 41 is stopped. This can prevent the image from being captured and distributed even though no abnormality has occurred in the target person TR1.

Next, an example of FIG. 15B will be described. In FIG. 15B, it is assumed that the control unit 48 determines that an abnormality has occurred in the target person TR1 based on the data acquired by the sensor 10, at time t1.

In this case, the control unit 48 starts measurement of the imaging standby time from time t1. When the imaging standby time T1 elapses at time t2, the imaging unit 21 or 41 starts capturing of an image including the target person TR1.

At time t3, when the control unit 28 or 48 determines that an abnormality has occurred in the target person TR1 based on the captured image, the control unit 48 starts measurement of the distribution standby time.

When the distribution standby time T2 elapses at time t4, the control unit 48 starts distribution of images. Thus, when the possibility that an abnormality has occurred in the target person TR1 is high, the image can be distributed.

As described above in detail, according to the second embodiment, when the state of the target person TR1 estimated from the data acquired by the sensor 10 that acquires data on the state of the target person is a predetermined state (a state in which an abnormality has occurred in the target person TR1), the control unit 48 causes the imaging unit 21 or 41 to start capturing an image including the target person TR1 and estimates (detects) the state of the target person TR1 based on the image captured by the imaging unit 21 or 41. This makes it possible to check whether the state of the target person TR1 estimated from the data acquired by the sensor 10 is correct.

In the second embodiment, the control unit 48 continues image capturing when the state of the target person TR1 estimated (detected) based on the image captured by the imaging unit 21 or 41 is the predetermined state (a state in which an abnormality has occurred in the target person TR1). Thus, an image of the target person TR1 in which an abnormality has occurred can be recorded.

When the image capturing is continued, the control unit 28 or 48 may notify the target person TR1 of information on the image capturing. For example, the control unit 28 or 48 may notify the target person TR1 of the timing at which the recording of the captured image in the storage unit 24 or 44 is started. This allows the target person TR1 to know that the captured image is recorded.

The control unit 28 or 48 may notify the target person TR1 that the image is being captured. This allows the target person TR1 to know that an image including himself/herself is being captured.

In the second embodiment, the control unit 48 starts distribution of images captured by the imaging unit 21 or 41 when the state of the target person TR1 estimated (detected) based on the image is the predetermined state (a state in which an abnormality has occurred in the target person TR1). Thus, when it is considered that there is a high possibility that an abnormality has occurred in the target person TR1, the distribution of the image can be started.

In the second embodiment, the control unit 28 or 48 stores the image used for the estimation of the state of the target person TR1 when the state of the target person TR1 estimated based on the image is the predetermined state (a state in which an abnormality has occurred in the target person TR1). This makes it possible to check and verify later the image base on which it is determined that an abnormality has occurred in the target person TR1.

In the second embodiment, the control unit 48 starts distribution of images including the target person TR1 when the distribution standby time elapses after it is detected that the state of the target person TR1 is the predetermined state (a state in which an abnormality has occurred in the target person TR1) based on the image. Since there is a time lag between the determination that an abnormality has occurred in the target person TR1 based on the image and the distribution of the image, the target person TR1 can take an action necessary for protecting the privacy of the target person TR1 during the distribution standby time when no abnormality has occurred in the target person TR1.

In the second embodiment, the control unit 48 notifies the target person TR1 of information on the distribution of the image before the process of distributing the image. This allows the target person TR1 to take necessary actions to protect the privacy of the target person TR1 before the process of distributing the image starts.

In the second embodiment, the control unit 28 or 48 stops image capturing when the state of the target person TR1 detected based on the image is not in a predetermined state (a state in which an abnormality has occurred in the target person TR1). That is, when it is determined that no abnormality has occurred in the target person TR1 based on the image, the control unit 28 or 48 stops image capturing. This can prevent a situation in which the image including the target person TR1 is continuously captured and the privacy of the target person TR1 is not protected, even though there is no abnormality in the target person TR1.

In the second embodiment, when the state of the target person TR1 detected based on the image is not in the predetermined state (when no abnormality has occurred in the target person TR1), the control unit 48 transmits a predetermined message (for example, a message indicating that an abnormality was erroneously detected) to the mobile terminal MT1. This allows the person who carries the mobile terminal MT1 (the person who watches over the target person TR1) to know that the target person TR1 is safe.

In the above second embodiment, when the imaging unit 21 or 41 starts imaging, the image captured by the imaging unit 21 or 41 may be stored in the storage unit 24 or 44. In this case, when the state of the target person TR1 detected based on the image is not in the predetermined state (a state in which an abnormality has occurred in the target person TR1), the control unit 28 or 48 may delete the image (including the image used for detecting the state of the target person TR1) stored in the storage unit 24 or 44. This can protect the privacy of the target person TR1.

In the above first and second embodiments, one of the imaging standby time and the distribution standby time may be omitted. In this case, it is sufficient if the target person TR1 is able to perform either an input to prohibit imaging or an input to prohibit distribution.

In the above first and second embodiments, there may be a plurality of mobile terminals to which messages and images are distributed.

Third Embodiment

In the first and second embodiments, the example in which the image is distributed to one mobile terminal MT1 has been described, but when there are a plurality of persons watching over the target person TR1, the distribution timing of the image may be changed according to the type (attribute) of the person watching over the target person.

The watching system 100 according to the third embodiment is different from the first and second embodiments in the processes executed by the control unit 48 and the control unit 28. The third embodiment is different from the first and second embodiments in that a distribution destination list is stored in the storage unit 44 of the master camera 40.

FIG. 16 is a diagram illustrating an example of the distribution destination list. The distribution destination list includes fields of ID, name, communication information, and group. The identifier for uniquely identifying the person who watches over the target person TR1 is stored in the field of ID. The field of name stores the name of the person who watches over the target person TR1. The communication information includes information necessary for directly distributing an image from the master camera 40 to the mobile terminal (for example, IP information of the mobile terminal). The group is for classifying persons identified by the ID, and in the present embodiment, one of Groups 1 to 3 is stored. Here, Group 1 indicates, for example, a family of the target person TR1, Group 2 indicates, for example, a relative of the target person TR1, and Group 3 indicates, for example, a care helper or a care manager of the target person TR1.

In the third embodiment, the control unit 48 changes the distribution timing and the distribution content of the image according to the group. In the present embodiment, it is assumed that the image is distributed to Groups 1 and 2, but the image is not distributed to Group 3.

Figure 17:
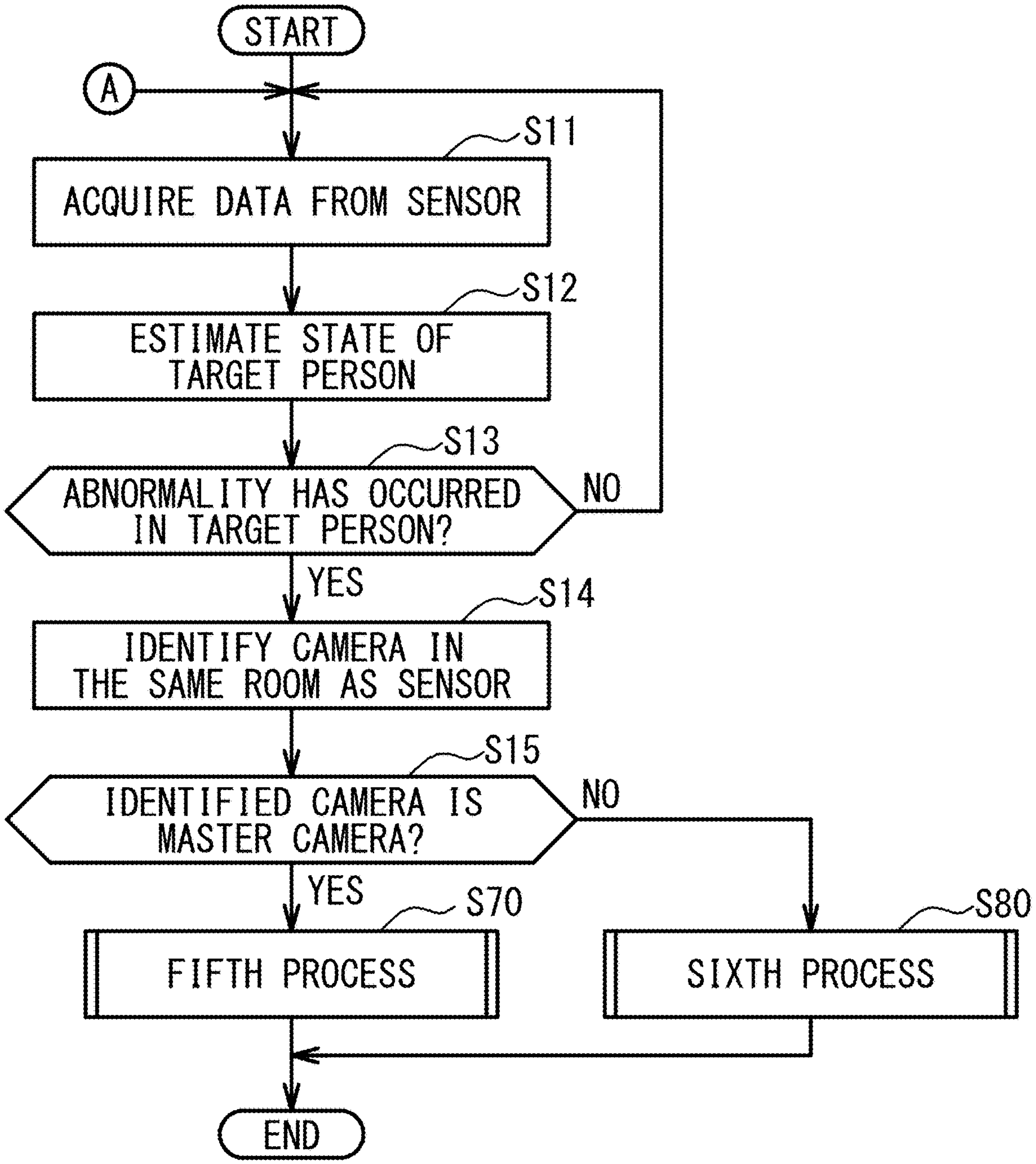
FIG. 17 is a flowchart illustrating an example of a process executed by the control unit of the master camera in a watching system according to a third embodiment.

FIG. 17 is a flowchart illustrating an example of a process executed by the control unit 48 of the master camera 40 in the watching system 100 according to the third embodiment. The process of FIG. 17 is different from the processes of FIG. 5 and FIG. 10 in the process (step S70: fifth process) executed when the camera identified in step S14 is the master camera 40 (step S15/YES) and the process (step S80: sixth process) executed when the camera identified in step S14 is the slave camera 20 (step S15/NO).

Figure 18A:
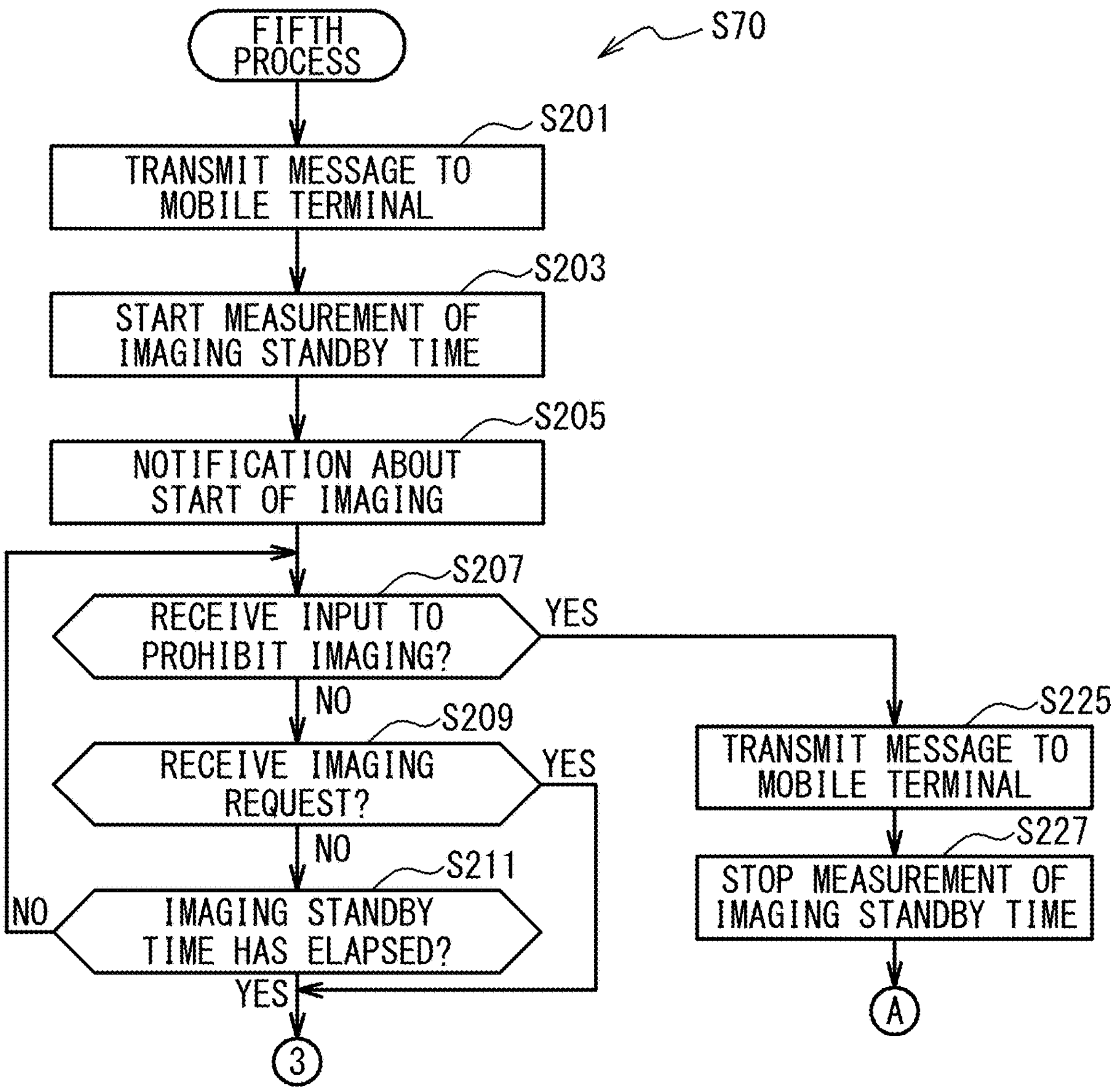
FIG. 18A and FIG. 18B are flowcharts illustrating details of a fifth process.
Figure 18B:
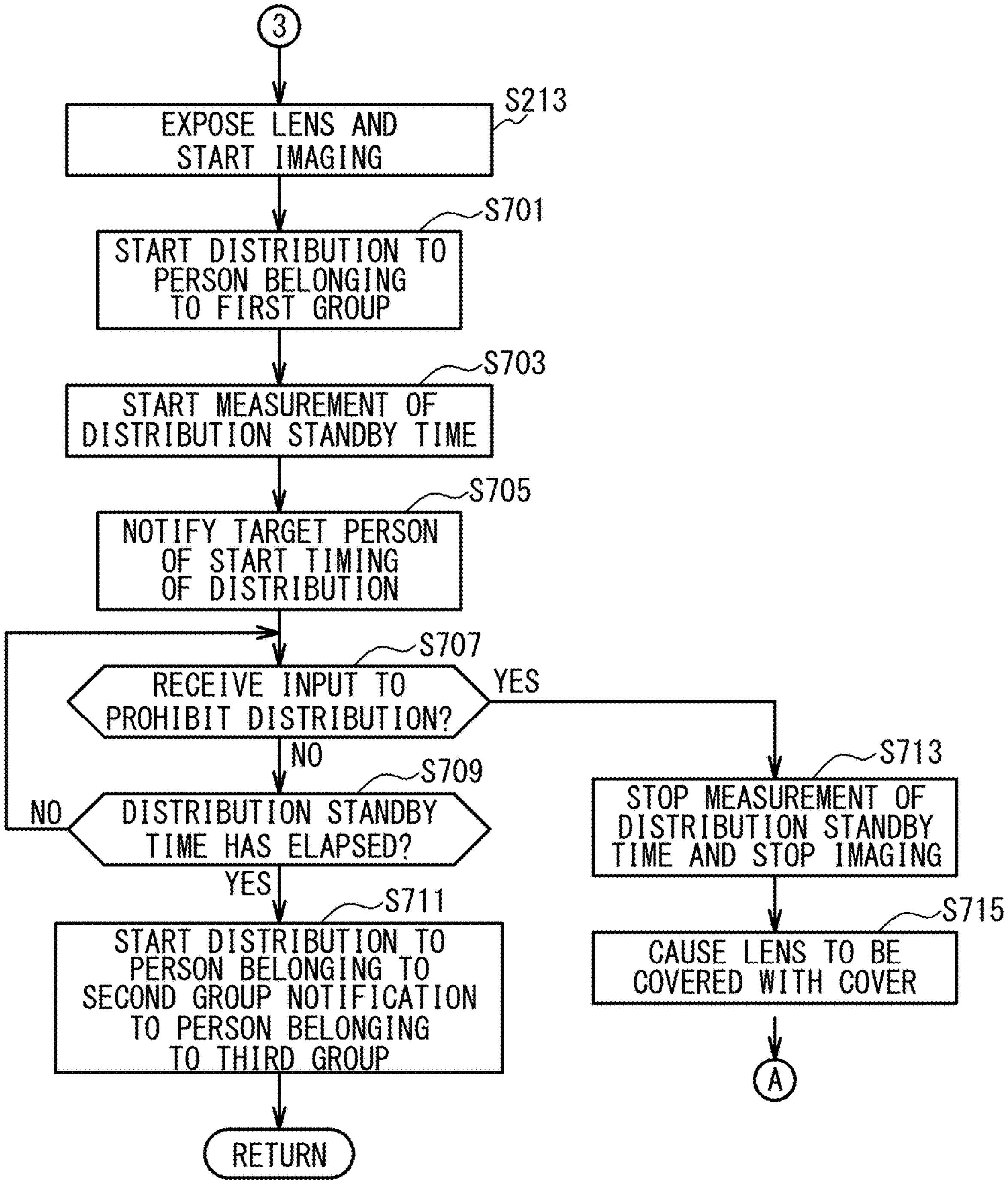

FIG. 18A and FIG. 18B are flowcharts illustrating the details of the fifth process. In FIG. 18A and FIG. 18B, the processes of steps S201 to S213 and steps S225 and S227 are the same as those of the first process illustrated in FIG. 6, and thus are denoted by the same symbols and will not be described in detail.

In the process of FIG. 18A and FIG. 18B, when capturing of an image including the target person TR1 is started (step S213), the control unit 48 starts the distribution of the image captured by the imaging unit 41 to the mobile terminals of the persons belonging to Group 1 (first group) (for example, the person with the ID "OB1" in FIG. 16) (step S701). This allows the person belonging to Group 1 to quickly check the state of the target person TR1 by the image.

Then, the control unit 48 starts measurement of the distribution standby time (step S703).

The control unit 48 notifies the target person TR1 of the timing at which the image captured by the imaging unit 41 is distributed to the person (the person with ID "OB2" in FIG. 16) belonging to the group other than Group 1 and to which the image is to be distributed (step S705). For example, the control unit 48 causes the loudspeaker 43 to output a voice such as "Distribution of an image to persons belonging to Group 2 will be started in five seconds". This allows the target person TR1 to know that the distribution of the image captured by the imaging unit 41 to the person belonging to Group 2 will be started.

Then, the control unit 48 determines whether an input to prohibit (cancel) the distribution of the image is received (step S707).

When an input to prohibit the distribution of the image is received (step S707/YES), the control unit 48 stops the measurement of the distribution standby time and stops imaging by the imaging unit 41 (step S713). This can prevent the image captured by the imaging unit 41 from being distributed to persons belonging to groups other than Group 1. Since the imaging by the imaging unit 41 is stopped, the distribution of the image to the persons belonging to Group 1 is also stopped. At this time, the control unit 48 may transmit a message reporting that the determination in step S13 was erroneous or that no abnormality has occurred in the target person TR1 to the person belonging to each group.

Thereafter, the control unit 48 covers the lens 421 of the master camera 40 with the cover 422 (step S715), and returns to step S11 in FIG. 17.

When an input to prohibit the distribution of the image is not received (step S707/NO), the control unit 48 determines whether the distribution standby time has elapsed (step S709). Specifically, it is determined whether the distribution standby time has elapsed since the start of the measurement of the distribution standby time in step S703. When the distribution standby time has not elapsed (step S709/NO), the process returns to step S707.

When the distribution standby time has elapsed (step S709/YES), the control unit 48 starts distribution of the image to the mobile terminal of the person belonging to Group 2 (second group), and notifies the mobile terminal of the person belonging to Group 3 that distribution of the image to Group 2 has been started, for example (step S711). This allows the person belonging to Group 2 to check the state of the target person TR1 by the image. In addition, the fact that the distribution of the image to Group 2 is started means that there is a high possibility that an abnormality has occurred in the target person TR1. Since the person belonging to Group 3 can know that the possibility that an abnormality has occurred in the target person TR1 is high by the notification, the person can take a measure such as visiting the target person TR1.

Figure 19A:
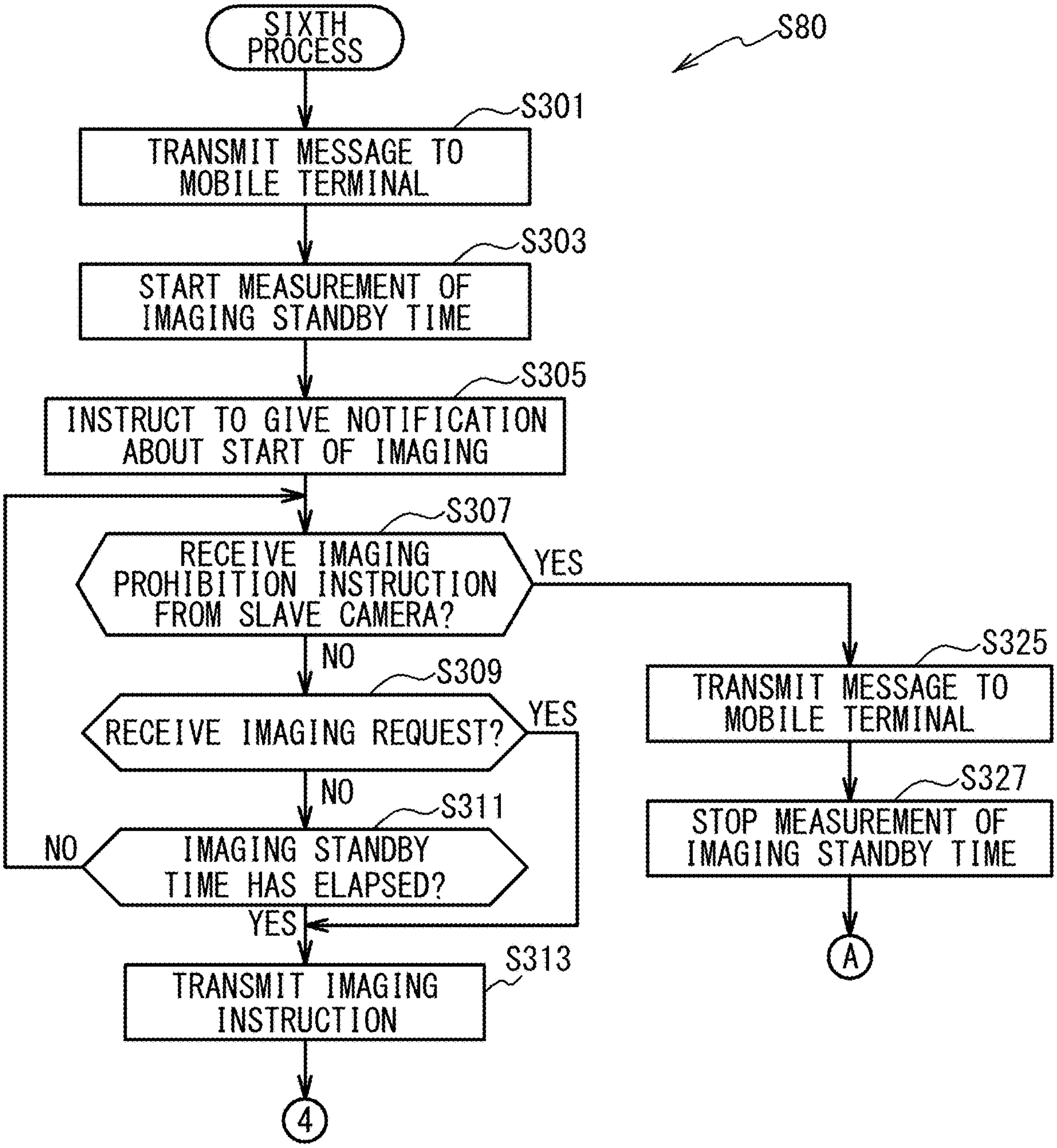
FIG. 19A and FIG. 19B are flowcharts illustrating details of a sixth process.
Figure 19B:
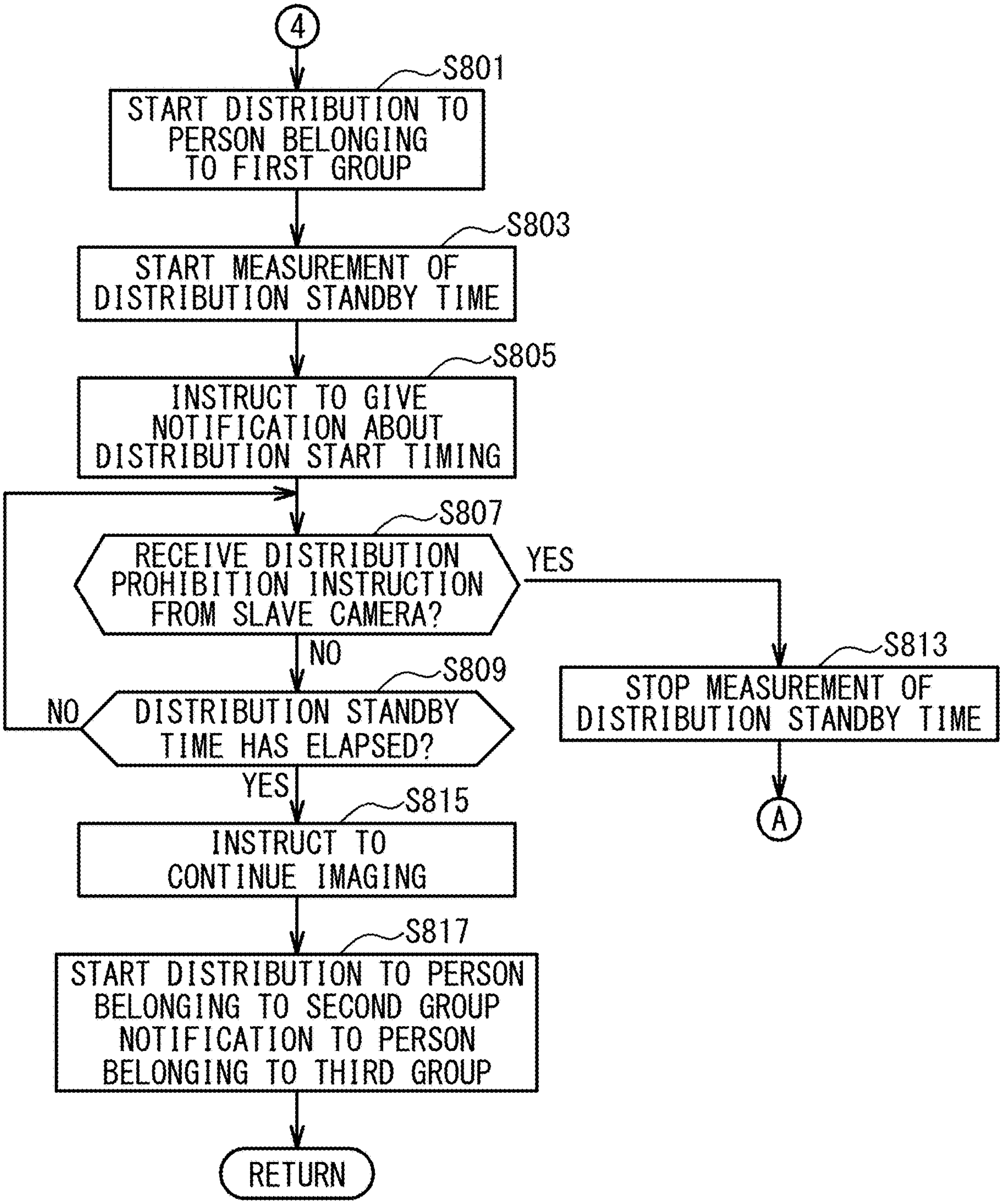
Figure 20:
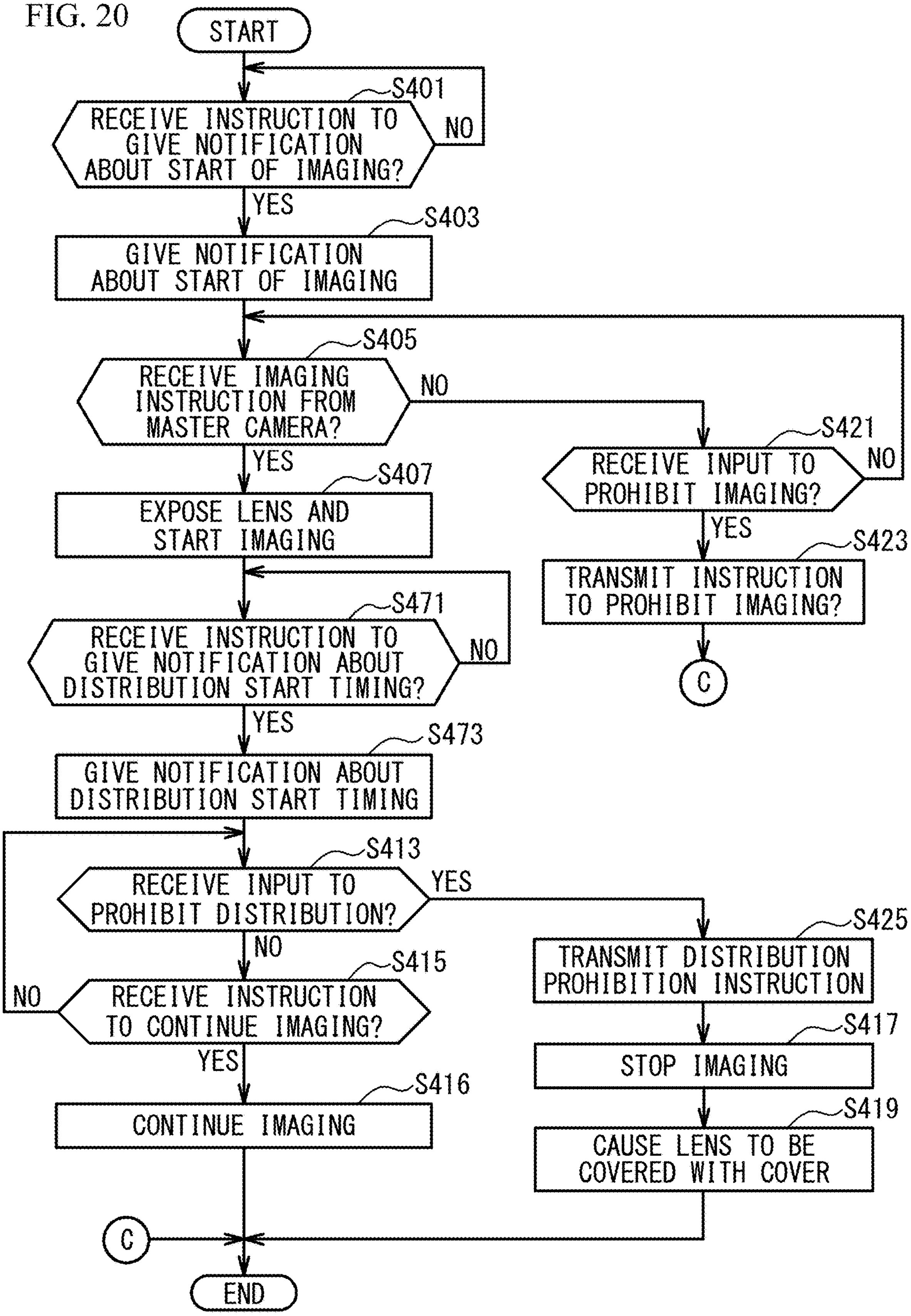
FIG. 20 is a flowchart illustrating an example of a process executed by the control unit of the slave camera in the watching system according to the third embodiment.

Next, the sixth process will be described in detail. FIG. 19A and FIG. 19B are flowcharts illustrating details of the sixth process. FIG. 20 is a flowchart illustrating an example of a process executed by the control unit 28 of the slave camera 20 in the watching system 100 according to the third embodiment. The sixth process will be described together with the process executed by the control unit 28 of the slave camera 20.

In FIG. 19A and FIG. 19B, the processes of steps S301 to S313 and steps S325 and S327 are the same as those of the second process of FIG. 7, and thus are denoted by the same symbols and detailed description thereof will be omitted.

In FIG. 20, the processes other than steps S471 and S473 are the same as those illustrated in FIG. 8, and therefore, the same symbols are used and the detailed description is omitted.

In FIG. 19A, when transmitting an imaging instruction to the slave camera 20 (step S313), the control unit 48 of the master camera 40 starts distribution of images captured by the imaging unit 21 of the slave camera 20 to the mobile terminal of the person belonging to Group 1 (first group) (for example, person with the ID "OB1" in FIG. 16) (step S801). This allows the person belonging to Group 1 can quickly check the state of the target person TR1 through the image.

Then, the control unit 48 starts measurement of the distribution standby time (step S803).

The control unit 48 instructs the slave camera 20 to notify of the timing at which the image captured by the imaging unit 21 is distributed to the person (person with the ID "OB2" in FIG. 16) belonging to the group other than Group 1 and to which the image is to be distributed (step S805).

On the other hand, when causing the imaging unit 21 to start capturing an image including the target person TR1 (FIG. 20: step S407), the control unit 28 of the slave camera 20 waits until an instruction to notify of the timing of start of distribution of the image is received from the master camera 40 (step S471/NO).

When the instruction to notify of the timing of start of distribution of the image is received from the master camera 40 (step S471/YES), the timing of distribution of the image captured by the imaging unit 21 to the person (person with the ID "OB2" in FIG. 16) belonging to the group other than Group 1 and to which the image is to be distributed is notified (step S473). For example, the control unit 28 causes the loudspeaker 23 to output a voice such as "Distribution of an image to a person belonging to Group 2 will be started in five seconds". This allows the target person TR1 to know that the distribution of the image captured by the imaging unit 21 to the person belonging to Group 2 is started.

The subsequent processes are the same as those illustrated in FIG. 8, and thus detailed description thereof will be omitted.

On the other hand, the control unit 48 of the master camera 40 determines whether the distribution prohibition instruction is received from the slave camera 20 (FIG. 19B: step S807).

When the distribution prohibition instruction is received (step S807/YES), the control unit 48 stops the measurement of the distribution standby time (step S813). This can prevent the image captured by the imaging unit 21 from being distributed to persons belonging to groups other than Group 1. Since the imaging by the imaging unit 21 is stopped, the distribution of the image to the persons belonging to Group 1 is also stopped. At this time, the control unit 48 may transmit a message reporting that that the determination in step S13 of FIG. 17 was erroneous or that no abnormality has occurred in the target person TR1 to the person belonging to each group. After the process of step S813, the process returns to step S11 of FIG. 17.

When the distribution prohibition instruction is not received (step S807/NO), the control unit 48 determines whether the distribution standby time has elapsed (step S809). Specifically, it is determined whether the distribution standby time has elapsed since the start of the measurement of the distribution standby time in step S803. When the distribution standby time has not elapsed (step S809/NO), the process returns to step S807.

When the distribution standby time has elapsed (step S809/YES), the control unit 48 transmits an instruction to continue imaging to the slave camera 20 (step S815), starts distribution of an image to the mobile terminals of the persons belonging to Group 2 (second group), and notifies the mobile terminals of the persons belonging to Group 3 that distribution of an image to Group 2 has been started, for example (step S817). This allows the person belonging to Group 2 to check the state of the target person TR1 by the image. In addition, the fact that the distribution of the image to Group 2 is started means that there is a high possibility that an abnormality has occurred in the target person TR1. Since the person belonging to Group 3 can know that the possibility that an abnormality has occurred in the target person TR1 is high by the notification, the person can take an action such as visiting the target person TR1.

Figure 21:
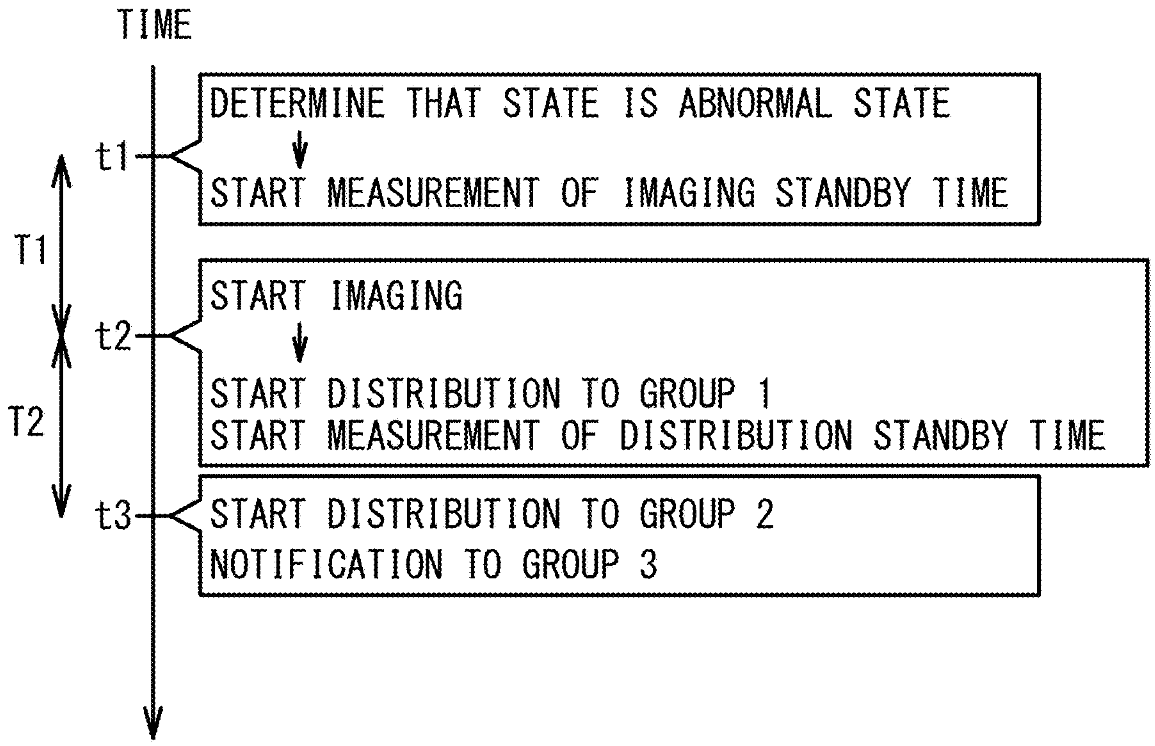
FIG. 21 is a time chart illustrating an example of a process executed in the watching system according to the third embodiment.

FIG. 21 is a time chart illustrating an example of a process in the watching system 100 according to the third embodiment. In FIG. 21, it is assumed that the control unit 48 determines that an abnormality has occurred in the target person TR1 at time t1.

In this case, the control unit 48 starts measurement of the imaging standby time from time t1. When the imaging standby time T1 elapses at time t2, the imaging unit 21 or 41 starts capturing of an image including the target person TR1. The control unit 48 starts distribution of the image to the mobile terminal of the person belonging to Group 1 and starts measurement of the distribution standby time.

When the distribution standby time T2 elapses at time t3, the control unit 48 starts distribution of images to the mobile terminals of the persons belonging to Group 2, and transmits a predetermined message to the mobile terminals of the persons belonging to Group 3. As described above, when there are a plurality of persons watching over the target person TR1, by changing the distribution timing of the image and the notification content according to the attribute of the person watching over the target person TR1, it is possible to achieve both the observation of the target person TR1 and ensuring of the privacy of the target person TR1.

As described above in detail, according to the third embodiment, when the imaging unit 21 or 41 starts imaging, the control unit 48 starts distributing the image captured by the imaging unit 21 or 41 to the persons belonging to Group 1, and when the distribution standby time elapses after the imaging unit 21 or 41 starts imaging, the control unit 48 starts distributing the image captured by the imaging unit 21 or 41 to the persons belonging to Group 2. This allows, for example, a close relative of the target person TR1 to know the state of the target person TR1 by the image, and the image is distributed to a person other than the close relative after the distribution standby time elapses, and thus it is possible to protect the privacy of the target person TR1.

(Hardware Configuration)

Figure 22A:
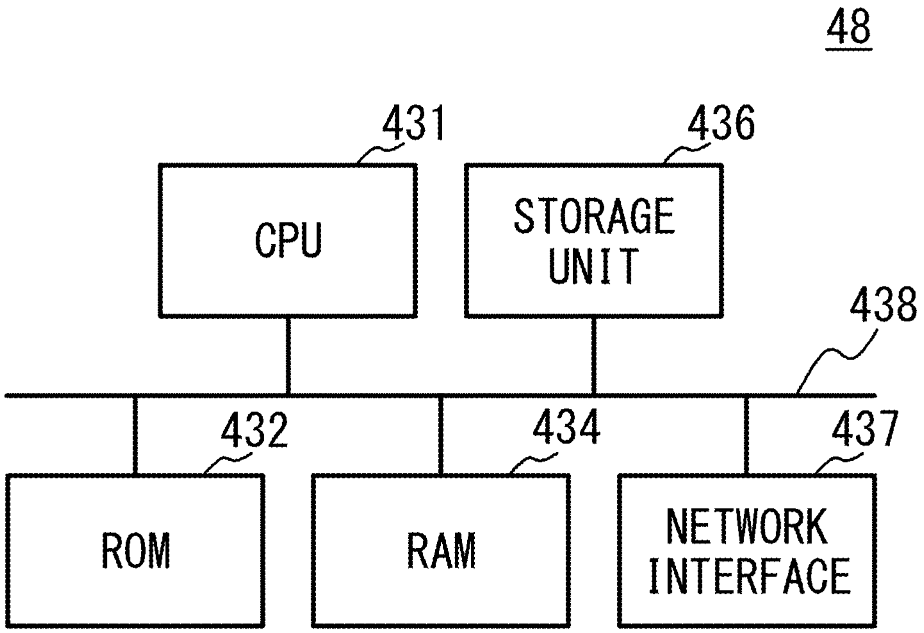
FIG. 22A is a diagram illustrating a hardware configuration of the control unit of the master camera.

FIG. 22A is a diagram illustrating a hardware configuration of the control unit 48. As illustrated in FIG. 22A, the control unit 48 includes a CPU 431, a ROM 432, a RAM 434, a storage unit 436, a network interface 437, and the like. These components of the control unit 48 are connected to a bus 438. The functions of the control unit 48 are implemented by the CPU 431 executing the program stored in the ROM 432 or the storage unit 436.

Figure 22B:
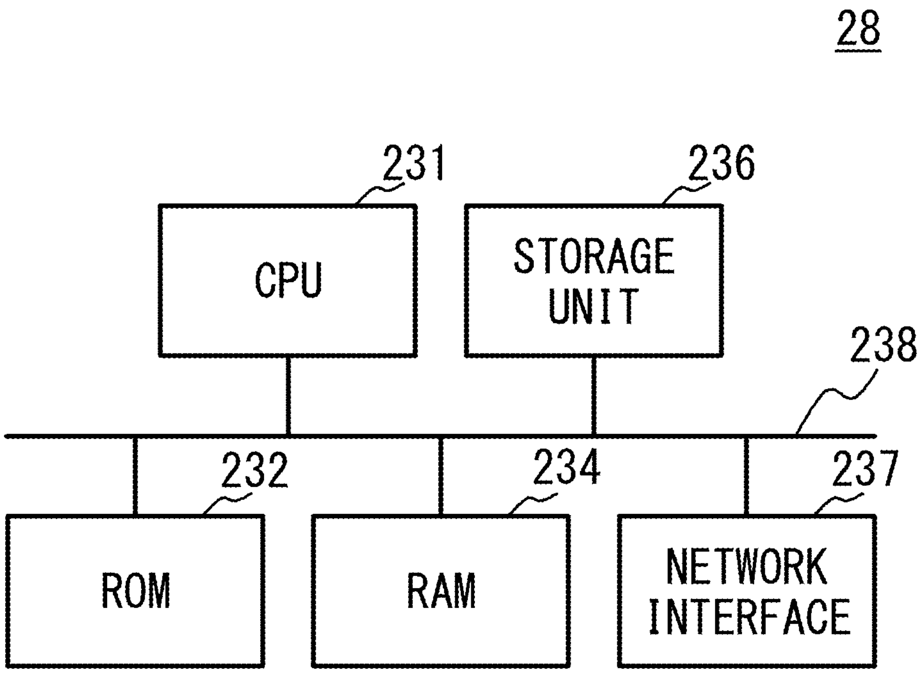
FIG. 22B is a diagram illustrating a hardware configuration of the control unit of the slave camera.

FIG. 22B is a diagram illustrating a hardware configuration of the control unit 28. The control unit 28 includes a CPU 231, a ROM 232, a RAM 234, a storage unit 236, a network interface 237, and the like. These components of the control unit 28 are connected to a bus 238. The functions of the control unit 28 are implemented by the CPU 231 executing the program stored in the ROM 232 or the storage unit 236.

Figure 23:
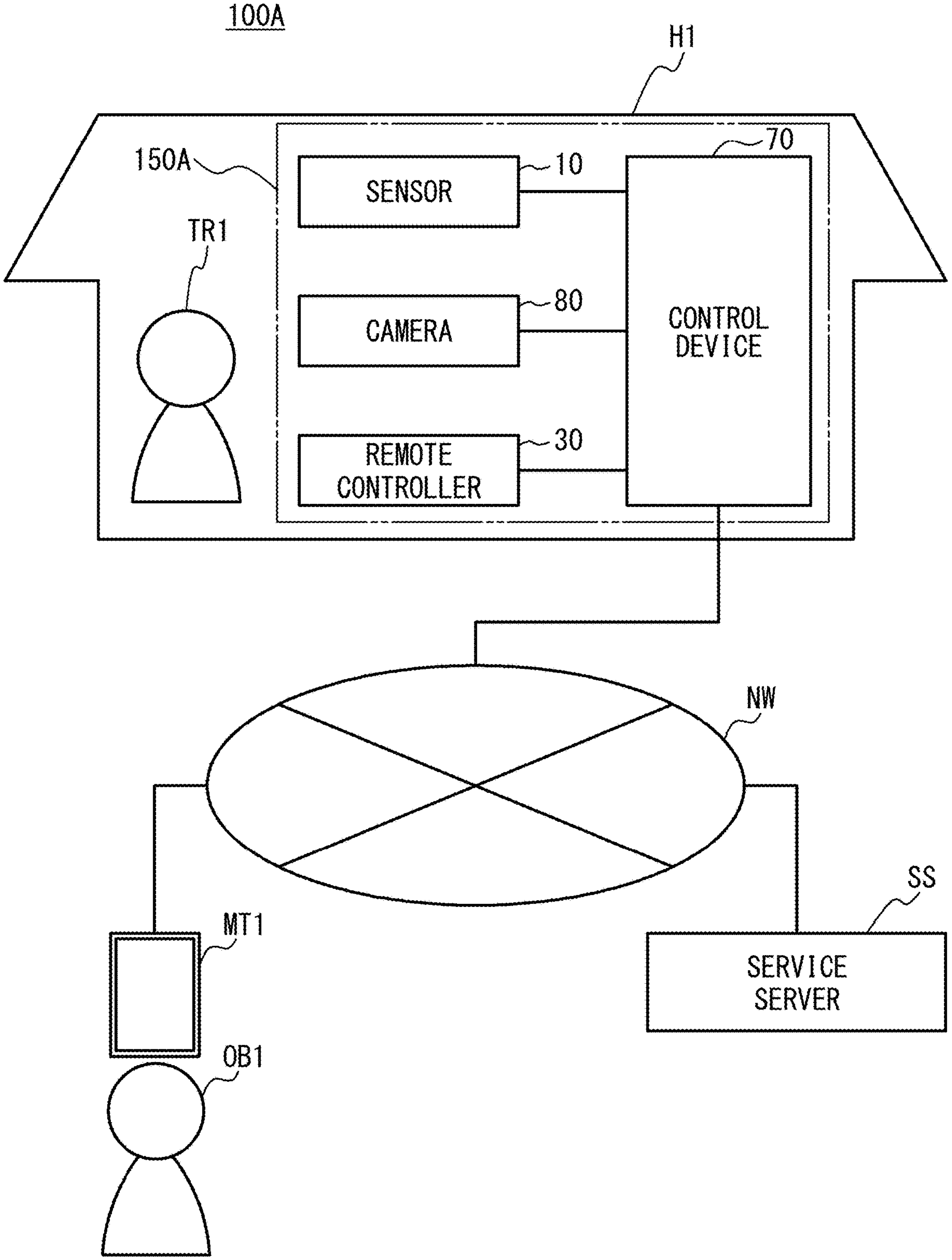
FIG. 23 is a diagram illustrating a configuration of a watching system according to a variation.

In the above first to third embodiments, the example in which the home-side system 150 includes one master camera 40 and one or more slave cameras 20 has been described, but this does not intend to suggest any limitation. FIG. 23 is a diagram illustrating a configuration of a watching system 100A according to a variation. As illustrated in FIG. 23, in a home-side system 150A, the master camera 40 is omitted, and the home-side system 150A includes the sensor 10, a camera 80, the remote controller 30, and a control device 70 that controls the entire home-side system 150A. The camera 80 may have the same configuration as the slave camera 20 described above.

Figure 24:
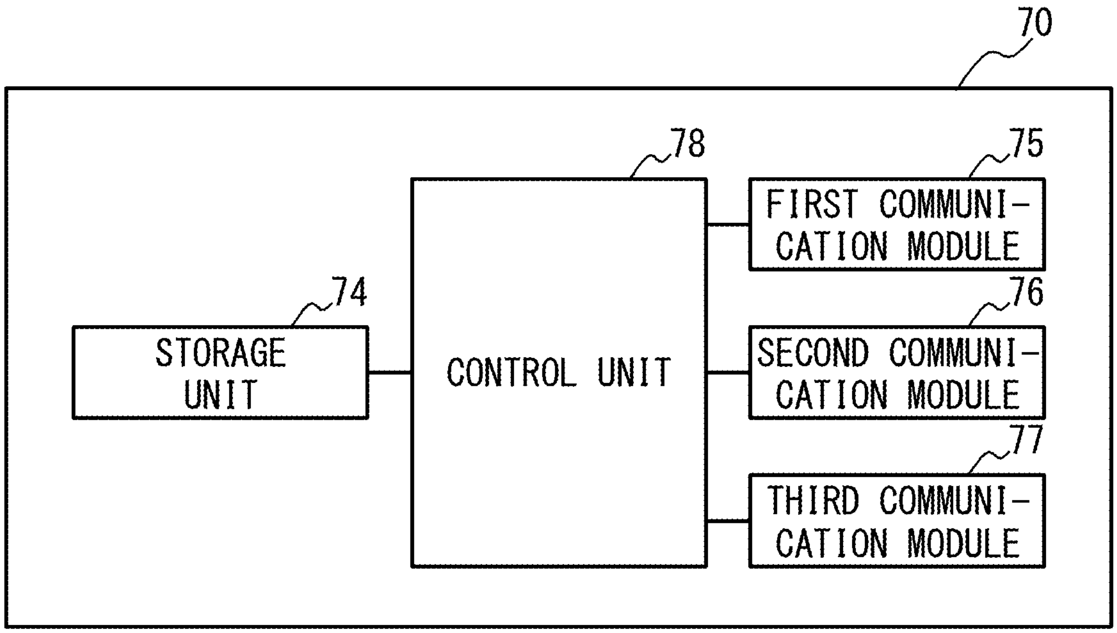
FIG. 24 is a functional block diagram illustrating a configuration of the control device in the variation.

FIG. 24 is a functional block diagram illustrating a configuration of the control device 70 in the variation. The control device 70 includes a storage unit 74, a first communication module 75, a second communication module 76, a third communication module 77, and a control unit 78. The first communication module 75, the second communication module 76, and the third communication module 77 are the same as the first communication module 45, the second communication module 46, and the third communication module 47, respectively, and thus detailed description thereof will be omitted.

The storage unit 74 stores address information of a server necessary for communicating with the outside (for example, the service server SS) of the home-side system 150A, identification information of the camera 80, a past (for example, the last one month) operation state of the home-side system 150A, a past (for example, the last one month) detection result of the state of the target person TR1 by the sensor 10 and the camera 80 of the home-side system 150A, and the like. The operation state of the home-side system 150A includes events that have occurred in the home-side system 150A, such as system activation, system termination, and error occurrence.

The control unit 78 executes substantially the same processes as the control unit 48, but in the variation, the processes of steps S15 and S20 in FIG. 5 are not necessary. Further, the process of FIG. 6 is not necessary. The hardware configuration of the control unit 78 is the same as that of the control unit 48, and thus detailed description thereof will be omitted.

In the home-side system 150, at least one of the master camera 40 and the slave camera 20 may be provided in plurality. In addition, in the home-side system 150, the slave camera 20 may be omitted. In this case, the number of the master cameras 40 may be one or more. Further, the control unit of the master camera 40 and the control unit of the slave camera 20 may be provided separately from the respective cameras. The master camera 40 and the slave camera 20 may share a control unit. That is, one control unit may control the master camera 40 and the slave camera 20. In addition, in a case where the slave camera 20 is omitted, one or a plurality of the master cameras 40 may be controlled by one control unit.

In the first to third embodiments, the sensor 10 may not be necessarily included in the watching system 100 (the home-side system 150). In this case, for example, an existing sensor installed in the residence of the target person TR1 may be connected to the watching system 100 to acquire data on the state of the target person from the existing sensor.

In the above first to third embodiments, the sensor 10, the master camera 40, and the slave camera 20 are separate, but the sensor 10 and the master camera 40 may be integrated, or the sensor 10 and the slave camera 20 may be integrated.

In the above first to third embodiments, the slave camera 20 and the master camera 40 may include a filter that does not transmit visible light, and the control units 28 and 48 may perform control such that the filter covers the lenses of the slave camera 20 and the master camera 40 in a state in which the imaging of the target person TR1 is not possible, and the lenses are exposed in a state in which the imaging of the target person TR1 is possible. This allows the slave camera 20 and the master camera 40 to be used as the sensor 10.

In the above first to third embodiments, the sensor 10 and the slave camera 20 may not be necessarily included in the watching system 100 (the home-side system 150). In this case, for example, an existing sensor and an existing camera that are installed in the residence of the target person TR1 can be connected to the home-side system 150, so that data on the state of the target person can be acquired from the existing sensor and visible light images can be acquired from the existing camera. In this case, the home-side system 150 may include a cover or the like that covers the lens of the existing camera, and the control unit 48 may set the existing camera to a state in which the imaging of the target person TR1 is physically impossible (a state in which the cover covers the lens of the existing camera) until the state of the target person TR1 estimated from the data acquired by the existing sensor becomes a predetermined state.

In the above first to third embodiments, one of the slave camera 20 and the master camera 40 may be a camera that cannot be brought into a state in which the imaging of the target person TR1 is impossible during normal times (for example, the camera that does not include the cover 422).

In the above first to third embodiments, the master camera 40 may not necessarily include the imaging unit 21, the microphone 22, or the loudspeaker 23. In this case, the master camera 40 functions as a control device that controls the entire home-side system 150.

In the above first to third embodiments, the state of the target person TR1 is estimated based on the data acquired by the infrared array sensor, but this does not intend to suggest any limitation. For example, when the sensor 10 is an infrared camera, a vector representing the motion of the target person TR1 may be acquired by comparing frame images of the infrared camera, and the state of the target person TR1 may be estimated based on the feature amount of the vector. Also, a thermography may be used as the sensor 10 instead of or in addition to an infrared camera. For example, the state of the target person TR1 may be determined by a combination of a vector representing the motion of the target person TR1 detected by the infrared camera and a variation in body temperature. For example, when the sensor 10 is a radio wave sensor, the measurable "heart rate", "respiration rate", and "blood pressure" data are compared with data in normal times (data measured in the past), and it may be determined that the state of the target person TR1 is normal when the data are comparable, and it may be determined that an abnormality has occurred when the difference from the data in normal times is equal to or greater than a threshold value. In addition, when the sensor 10 is a depth sensor, the posture of the target person TR1 may be detected, and it may be determined that the target person TR1 is normal when a daily behavior (standing, walking, sitting, or lying down) is detected, and it may be determined that an abnormality has occurred when an abnormal behavior (falling or being immobile for a long time) is detected. In addition, in a case where the sensor 10 is a vibration sensor, it may be determined that an abnormality has occurred when vibration exceeding a threshold value is detected. In addition, when the sensor 10 is a sound sensor, it may be determined that an abnormality has occurred when an impact sound exceeding a threshold value is detected. When the sensor 10 is a wearable sensor, the measurable "heart rate", "respiration rate", and "blood pressure" data are compared with data in the normal times (data measured in the past), and it may be determined that the state of the target person TR1 is normal when the data are comparable, and it may be determined that an abnormality has occurred when the difference from the data in normal times is equal to or greater than a threshold value. Further, for example, a line sensor may be used as the sensor 10.

In the first to third embodiments, the state of the target person TR1 may be estimated by combining different types of the sensors 10. For example, the state of the target person TR1 may be estimated by combining a vibration sensor and a sound sensor.

In the above first to third embodiments, the predetermined state is described as a state in which an abnormality has occurred in the target person TR1, but this does not intend to suggest any limitation. For example, when the sensor 10 is a thermometer and a hygrometer, heat stroke is likely to occur when the measured temperature is equal to or higher than a predetermined value and the measured humidity is equal to or higher than a predetermined value. In this case, the measurement of the imaging standby time may be started by setting a state in which the target person TR1 may have heat stroke (a state in which the target person TR1 is estimated to have an abnormality) as the predetermined state, instead of whether the target person TR1 has heat stroke (whether an abnormality has occurred).

In the above first to third embodiments, an input to prohibit imaging or distribution is received via the microphone 42 included in the master camera 40 or the microphone 22 included in the slave camera 20, but this does not intend to suggest any limitation. For example, the remote controller 30 may include a microphone, and may receive an input to prohibit imaging via the microphone.

In the first embodiment, the input to prohibit (cancel) imaging or the distribution is not limited to the predetermined voice, and may be, for example, a predetermined gesture, an operation on a predetermined device (the remote controller 30, a smartphone, or the like), or the like. In the case that the input to prohibit (cancel) imaging is a predetermined gesture, when it is determined that an abnormality has occurred in the target person TR1, the control unit 48 may bring the master camera 40 or the slave camera 20 into a state in which the target person TR1 can be imaged.

In the above first to third embodiments, when the distribution of the image is started, for example, if a predetermined operation is performed by the remote controller 30, the capturing of the image and the distribution of the image may be stopped. For example, when the fallen target person TR1 recovers from the fallen state, the target person TR1 can instruct the master camera 40 to stop image capturing and image distribution by the remote controller 30. In addition, when the observer OB1 of the target person TR1 who receives a message or checks the distributed image visits the home H1 of the target person TR1, the observer OB1 can instruct the master camera 40 to stop image capturing and image distribution by the remote controller 30. Further, an instruction to stop the distribution of the image may be transmitted from the mobile terminal MT1 of the observer OB1.

In the above first to third embodiments, while an image is being distributed, a notification of "distribution is being performed" may be continuously given from a loudspeaker or the like.

In the above first to third embodiments, the control unit 48 and the control unit 28 may not perform the above processes when the target person TR1 is sleeping. For example, when the target person TR1 is lying on the bed at a predetermined time, the control unit 48 and the control unit 28 may not perform the above processes. Whether the target person TR1 is lying on the bed can be detected by, for example, a weighing sensor provided on the bed. This can prevent the sleep of the target person TR1 from being determined as abnormal.

In the above first to third embodiments, when a predetermined voice such as "Help" is input during the imaging standby time, imaging may be started without waiting for the imaging standby time to elapse, and distribution of an image may be started.

In the above first to third embodiments, the control unit 48 may execute a part or all of the processes executed by the control unit 28. The second embodiment and the third embodiment may be combined as appropriate.

The processing functions described above can be implemented by a computer. In this case, a program describing the processing contents of the functions to be included in the processing device (CPU) is provided. The program is executed by the computer, and thus the processing functions are realized on the computer. The program describing the processing contents may be recorded in a computer-readable recording medium (excluding a carrier wave).

When the program is distributed, for example, the program is sold in a form of a portable recording medium such as a DVD (Digital Versatile Disc) or a CD-ROM (Compact Disc Read Only Memory) in which the program is recorded. The program may be stored in a storage device of a server computer, and the program may be transferred from the server computer to another computer via a network.

A computer that executes the program stores the program recorded in a portable recording medium or the program transferred from the server computer in its own storage device, for example. The computer reads the program from the storage device and executes processes according to the program. The computer may read the program directly from the portable recording medium and execute the processes according to the program. Further, the computer can also sequentially execute processes according to the received program each time the program is transferred from the server computer.

The above-described embodiments are preferred examples of the present invention, and can be appropriately combined. However, the present disclosure is not limited to this, and various modifications can be made without departing from the scope of the present invention.

The invention claimed is:

1. A non-transitory computer-readable recording medium storing a program causing a computer to execute a process, the process including:

causing an imaging unit to start capturing of an image including a target person when a first predetermined time elapses after a state of the target person determined based on data acquired by an acquisition unit, which acquires the data on the state of the target person, becomes a predetermined state;

giving notification about the capturing of the image during the first predetermined time;

starting distribution of the image captured by the imaging unit when a second predetermined time elapses after the imaging unit starts the capturing of the image; and giving notification about the distribution during the second predetermined time.

2. The non-transitory computer-readable recording medium according to claim 1, wherein the giving of the notification about the capturing of the image includes giving notification that a current time is within the first predetermined time or that the current time is before the capturing of the image is started.

3. The non-transitory computer-readable recording medium according to claim 1, wherein the giving of the notification about the capturing of the image includes giving notification of a timing of start of the capturing of the image.

4. The non-transitory computer-readable recording medium according to claim 1, wherein the giving of the notification about the capturing of the image, includes notifying of a time until the capturing of the image starts.

5. The non-transitory computer-readable recording medium according to claim 1, wherein the giving of the notification about the capturing of the image includes giving notification that a current time is in a period of time during which the capturing of the image can be prohibited.

6. The non-transitory computer-readable recording medium according to claim 1, wherein the giving of the notification about the distribution includes notifying of a timing of start of the distribution.

7. The non-transitory computer-readable recording medium according to claim 1, wherein the giving of the notification about the distribution includes notifying of a time until the image is distributed.

8. The non-transitory computer-readable recording medium according to claim 1, wherein the giving of the notification about the distribution includes giving notification that a current time is in a period of time during which the distribution can be prohibited.

9. The non-transitory computer-readable recording medium according to claim 1, wherein the causing of the imaging unit to start the capturing of the image is not performed when an input to prohibit the capturing of the image is received within the first predetermined time.

10. The non-transitory computer-readable recording medium according to claim 1, wherein the starting of the distribution is not performed when an input to prohibit the distribution is received within the second predetermined time.

11. The non-transitory computer-readable recording medium according to claim 1, wherein the notification is given using sound, display, an imaging unit, or a predetermined device or any combination thereof.

12. The non-transitory computer-readable recording medium according to claim 1, wherein the process further includes causing the imaging unit to start the capturing of the image when an input to start the capturing of the image is received within the first predetermined time.

13. The non-transitory computer-readable recording medium according to claim 1, wherein the data on the state of the target person is data other than a visible light image.

14. A watching system comprising:

an acquisition unit configured to acquire data on a state of a target person;

an imaging unit configured to start capturing of an image including the target person when a first predetermined time elapses after the state of the target person becomes a predetermined state; and a control unit configured to start distribution of the image captured by the imaging unit when a second predetermined time elapses after the imaging unit starts the capturing of the image, wherein the control unit is further configured to:

give notification about the capturing of the image during the first predetermined time; and give notification about the distribution during the second predetermined time.

15. A control device comprising: a control unit configured to cause an imaging unit to start capturing of an image including a target person when a first predetermined time elapses after a state of the target person determined based on data acquired by an acquisition unit that acquires the data on the state of the target person becomes a predetermined state, wherein the control unit is further configured to:

give notification about the capturing of the image during the first predetermined time;

start distribution of the image captured by the imaging unit when a second predetermined time elapses after the imaging unit starts the capturing of the image; and give notification about the distribution during the second predetermined time.

* * * * *